US006275659B1

(12) United States Patent
Ishihara et al.

(10) Patent No.: US 6,275,659 B1
(45) Date of Patent: Aug. 14, 2001

(54) METHOD AND APPARATUS FOR CONTROLLING EXPOSURE OF CAMERA

(75) Inventors: Fumio Ishihara; Mutsumi Naruse, both of Saitama; Takanori Kohno, Tokyo; Tetsuo Sakamoto, Tokyo; Kouichi Kobayashi, Tokyo; Teruyuki Tongu, Tokyo; Norifumi Nakagawa, Tokyo; Tomio Kurosu, Tokyo, all of (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 670 days.

(21) Appl. No.: 09/021,393

(22) Filed: Feb. 10, 1998

Related U.S. Application Data

(62) Division of application No. 08/833,004, filed on Apr. 4, 1997, now Pat. No. 5,774,747, which is a division of application No. 08/487,846, filed on Jun. 7, 1995, now Pat. No. 5,678,098.

(30) Foreign Application Priority Data

| Jun. 9, 1994 | (JP) | 6-127419 |
| Jun. 9, 1994 | (JP) | 6-127876 |
| Jun. 10, 1994 | (JP) | 6-129344 |
| Jun. 10, 1994 | (JP) | 6-129345 |
| Jun. 10, 1994 | (JP) | 6-129346 |

(51) Int. Cl.$^7$ ............................................. G03B 7/08
(52) U.S. Cl. ........................................................ 396/233
(58) Field of Search ......................... 396/233, 234, 396/274; 250/208.6; 356/222, 225

(56) References Cited

U.S. PATENT DOCUMENTS 4,530,585   7/1985   Kanai ................................. 396/161
4,547,663  10/1985   Kitagishi et al. ................. 250/201.2
4,746,949 * 5/1988   Takei et al. ............................ 396/233
4,937,611   6/1990   Miyazaki ............................... 396/234
4,987,434 * 1/1991   Soshi et al. ........................... 396/234
5,023,649   6/1991   Hayashi et al. ......................... 396/63
5,115,269   5/1992   Masanaga et al. .................... 396/106
5,319,416   6/1994   Takagi .................................. 396/100
5,351,309   9/1994   Lee et al. ............................. 382/199
5,534,968 * 7/1996   Takagi .................................. 396/264

FOREIGN PATENT DOCUMENTS 59-84226   5/1984   (JP) .
5-14255    2/1993   (JP) .

OTHER PUBLICATIONS

Norman Goldberg, Camera Technology The Dark Side of the Lens, Academic Press, pp. 57 and 58.

* cited by examiner

Primary Examiner—W. B. Perkey
(74) Attorney, Agent, or Firm—Young & Thompson

(57) ABSTRACT

An exposure control method and apparatus for a camera having a two-area divided brightness measurement system. A central light value is determined based on a central area brightness of a photographic scene, and a peripheral light value is determined based on a peripheral area brightness of the scene. After determining by comparison between the central and peripheral light values whether the scene is back-lighted or front-lighted, a correction coefficient specific to back-lighted scenes or that specific to front-lighted scenes is read from a memory. An exposure value suitable for a main subject is calculated according to the following equation:

$$Es = \log_2\{1-(1-\alpha)2^{LVb-LVa}\} - \log_2 \alpha + LVa$$

wherein Es represents the exposure value and $\alpha$ represents the correction coefficient.

6 Claims, 26 Drawing Sheets

FIG. 6A

| LIGHT VALUE (Lv) | SUBJECT DISTANCE: K(m) | | | |
|---|---|---|---|---|
| | 0.7 | 1.2 | 2.0 | 3.0 |
| CENTRAL PHOTOMETRIC AREA: LVa | 10.6 | 10.6 | 10.9 | 11.6 |
| PERIPHERAL PHOTOMETRIC AREA: LVb | 13.7 | 13.8 | 13.2 | 12.2 |
| MAIN SUBJECT: LVc | 9.8 | 9.8 | 9.8 | 9.6 |
| BACK GROUND: LVd | 13.8 | 13.4 | 13.3 | 13.2 |

FIG. 6C

| SUBJECT DISTANCE: K(m) | 0.7 | 1.2 | 2.0 | 3.0 |
|---|---|---|---|---|
| CORRECTION COEFFICIENT: $\alpha$ | 0.950 | 0.950 | 0.923 | 0.834 |

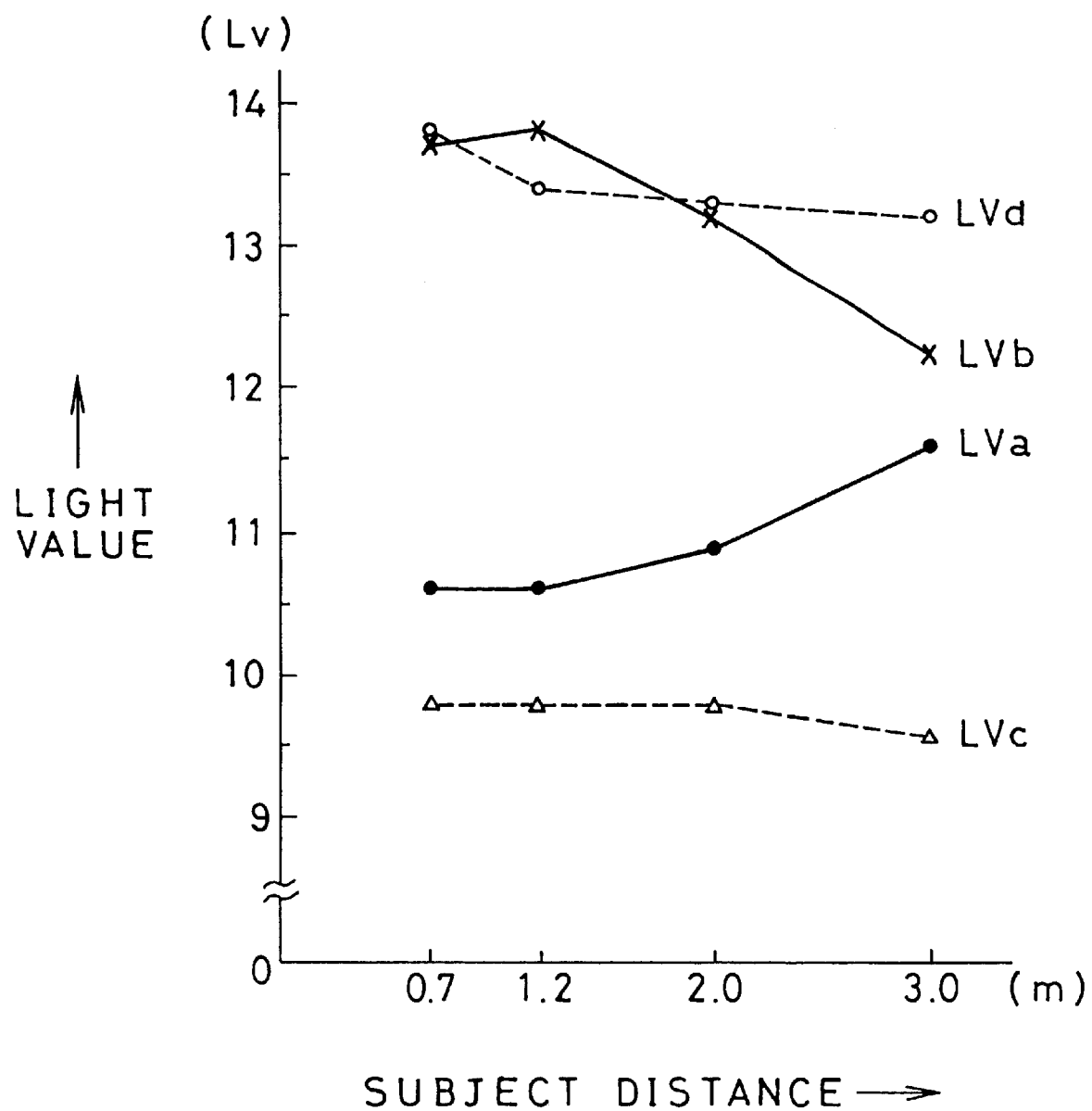

FIG. 12

| LIGHT VALUE (Lv) | LVa=5.0 LVb=6.0 | LVa=11.0 LVb=12.0 | LVa=12.0 LVb=10.0 | LVa=10.0 LVb=13.0 | LVa=10.0 LVb=14.0 |
|---|---|---|---|---|---|
| SCENE | FRONT-LIGHT | FRONT LIGHT | FRONT LIGHT | BACK LIGHT | BACK LIGHT |
| EXPOSURE VALUE (Ev) | Ea=5.0 Eb=5.86 | Ea=11.0 Eb=11.86 | Ea=12.0 Eb=10.65 | Ea=9.5 Eb=11.64 | Ea=8.48 Eb=12.5 |
| E1 (Ev) | 6.19 | 12.19 | 10.98 | 11.97 | 12.83 |
| E (Ev) | 10.5(LMT) | 12.19 | 10.98 | 11.97 | 12.83 |
| FE (fno) | 11.0 | 19.4 | 13.5 | 17.4 | 23.1 |
| MX (%) | 100 | 20 | 20 | 82 | 95 |
| FT (fno) | $K \leq 1.5$ 19 | $K \leq 1.5$ 19.4 | $K \leq 1.5$ 19 | $K \leq 1.5$ 19 | $K \leq 1.5$ 23.1 |
| | $K > 1.5$ 11 | $K > 1.5$ 19.4 | $K > 1.5$ 13.5 | $K > 1.5$ 17.4 | $K > 1.5$ 23.1 |
| VR (V) | $K \leq 1.5$ 2.98 | $K \leq 1.5$ 0.62 | $K \leq 1.5$ 0.60 | $K \leq 1.5$ 2.45 | $K \leq 1.5$ 3.0 |
| | $K > 1.5$ 1.0 | $K > 1.5$ 0.62 | $K > 1.5$ 0.3 | $K > 1.5$ 2.05 | $K > 1.5$ 3.0 |

| EV | P_N | EV | P_N | EV | P_N | EV |
|---|---|---|---|---|---|---|
| 16.0 | 3 | 14.0 | 5 | 12.0 | 8 | 10.0 |
| 15.9 | 3 | 13.9 | 5 | 11.9 | 8 | 9.9 |
| 15.8 | 3 | 13.8 | 6 | 11.8 | 8 | . |
| 15.7 | 4 | 13.7 | 6 | 11.7 | 8 | |
| 15.6 | 4 | 13.6 | 6 | . | . | |
| : | : | : | : | | | |

| EV | T_AE | EV | T_AE | EV | T_AE | EV |
|---|---|---|---|---|---|---|
| 16.0 | 0.5 | 14.0 | 3.2 | 12.0 | 1.6 | 10.0 |
| 15.9 | 1.8 | 13.9 | 4.0 | 11.9 | 2.4 | 9.9 |
| 15.8 | 2.4 | 13.8 | 1.0 | 11.8 | 2.9 | . |
| 15.7 | 0.2 | 13.7 | 1.8 | 11.7 | 3.4 | |
| 15.6 | 0.8 | 13.6 | 2.3 | . | . | |
| : | : | : | : | | | |

METHOD AND APPARATUS FOR CONTROLLING EXPOSURE OF CAMERA

CROSS-REFERENCE TO RELATED APPLICATIONS

This application is a division of application Ser. No. 08/833,004, filed Apr. 4, 1997, now U.S. Pat. No. 5,774,747 which is a divisional application of Ser. No. 08/487,846, filed Jun. 7, 1995, now U.S. Pat. No. 5,678,098.

BACKGROUND OF THE INVENTION

1. Field of the Invention

The present invention relates to an exposure control method for a camera and an apparatus for the method.

2. Background Art

In the case of an ordinary negative film, even if a picture frame is not exactly taken at a proper exposure value, it is possible to correct the image by controlling print-exposure so as to make a reasonable print. However, in an instant camera using a self-developing film, it is impossible to correct exposure afterward. Therefore, it is very important for instant photography to expose the film at a proper value.

In view of this, an exposure control method, called mix-exposure method, is suggested, for example, in U.S. Pat. No. 4,530,585 and JPB 5-14256, wherein an amount of flash light is always automatically projected even to a bright subject. In this method, a program shutter is controlled to obtain 80% of a necessary exposure amount from ambient light, while the flash light is added to make up for the remaining 20% of the proper exposure value, on the assumption that a proper exposure value (Ev) is determined in correspondence with a light value (Lv). According to the known method, even though the exposure value is calculated based on an average brightness, which is more or less affected by a background or subsidiary subjects, a satisfactory exposure of the main subject may be achieved in most cases, because the brightness of the main subject, mostly the nearest subject, is supplemented with the flash light.

Recently, cameras have been known that divide a photographic scene into several areas when measuring subject brightness. An exposure value is calculated based on respective brightness values of these areas after weighting each value with an appropriate coefficient. At that time, it is determined from the divisional brightness values, whether the scene is front-lighted or back-lighted. If the scene is back-lighted, an optimum exposure value can be preferably determined based mainly on brightness values of those areas which correspond to a main subject. In day-light synchronized photography, it is possible to obtain an almost satisfactory exposure with respect to both a main subject and a subsidiary subject by controlling shutter speed and aperture value based on a background brightness and illuminating a main subject with a supplementary flash light.

However, to determine an optimum exposure value in the divided brightness measurement with more accuracy, it is necessary to increase the number of divisional areas and weight the respective brightness values by using a complex calculation in accordance with the brightness distribution pattern. Even such a complex and expensive method is not always able to provide an optimum exposure of the main subject, because of wide variety of actual photographic scenes.

Also in the known mix-exposure method, since the mix rate of flash light to ambient light is determined based on an exposure value derived from an average brightness value of the whole area of the photographic scene, consequent photo-prints may contain under-exposed main subjects especially when the main subject is back-lighted or distant.

To achieve a reasonable exposure for any scene with a simpler and economic method, a camera has been known which adopts a photometric device having a central brightness measuring element and a peripheral brightness measuring element for measuring a central brightness from a central area of the scene and a peripheral brightness from a peripheral area. Because the main subject such as a human subject is very often located in the center area of the scene, the two-area divided brightness measuring method facilitates discrimination between front-lighted and back-lighted scenes, and permits controlling exposure mainly in accordance with the central brightness value.

However, since the central brightness value has a large effect on the exposure control especially for back-lighted scenes in this method, it is important to design the central brightness measuring element so as to pick up light from the main subject at a high probability. If the central brightness measuring element is too small, it tends to miss the main subject. If the central brightness measuring element is too large, it tends to cover beyond the main subject to a larger extent. In either case, an optimum exposure value could not be derived from the central brightness value.

OBJECT OF THE INVENTION

In view of the foregoing, an object of the present invention is to provide an exposure control apparatus using the two-area divided brightness measurement which is able to determine an optimum exposure value for a main subject at a high probability.

Another object of the present invention is to provide an exposure control method by which an optimum exposure value for a main subject can be determined for both front-lighted and back-lighted scenes without the need for complicated processing.

A further object of the present invention is to provide an exposure control apparatus which achieves an accurate exposure control even when the speed of shutter blades unexpectedly changes.

SUMMARY OF THE INVENTION

To achieve the above objects in a method using a central photometric element for detecting a central light value from a central area of a photographic scene and a peripheral photometric element for detecting a peripheral light value from a peripheral area of the scene, the present invention suggests calculating an exposure value for controlling exposure amount according to the following equation:

$$Es = \log_2[1-(1-\alpha)2^{LVb-LVa}] - \log_2 \alpha + LVa$$

wherein Es represents the exposure value, LVa and Lvb respectively represent the central and peripheral light values, and α represents a correction coefficient which is determined depending on whether the scene is back-lighted or front-lighted. The central photometric element preferably has a trapezoid shape.

In a mix-exposure method according to a preferred embodiment of the invention, a central exposure value is calculated from the central and peripheral light values using a specific equation and a first specific correction coefficient, and a peripheral exposure value is calculated from the central and peripheral light values using a second specific equation and a second correction coefficient.

The values of the first and second correction coefficients are determined depending on whether the scene is back-lighted or front-lighted, more preferably, depending also on subject distance. Thereafter, an exposure value effective for controlling a program shutter is determined based on the peripheral exposure value and a bias value added to the peripheral exposure value for biasing the effective exposure value toward under-exposure side. On the other hand, percentage or mix rate of flash light is determined based on a difference between the effective exposure value and the central exposure value when the scene is back-lighted. For front-lighted scenes, mix rate of flash light is determined based on a difference between the effective exposure value and the peripheral exposure value.

According to another preferred embodiment, one of shutter blades of the program shutter is provided with signal elements for monitoring rotational position of the shutter blade and/or moving speed of the shutter blade. By starting clocking when the number of pulses detected from the signal elements reaches a set value determined in accordance with a proper exposure value, and outputting a shutter close signal when a time period, which is also determined in accordance with the proper exposure value, has been clocked, the effect of change in shutter blade moving speed on the exposure amount is minimized.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein:

FIG. 6A is a table showing light values detected from a scene with respect to several subject distances;

FIG. 6B is a graph corresponding to the table shown in FIG. 6A;

FIG. 6C is a table showing optimum correction coefficients for the respective subject distances in relation to FIG. 6A;

FIG. 12 is a table showing examples of data detected by the exposure control device of the second embodiment;

FIG. 14 is an explanatory view of a conversion table used in the third embodiment for converting an exposure value into a pulse number;

FIG. 15 is an explanatory view of a conversion table used in the third embodiment for converting an exposure value into a time period;

DETAILED DESCRIPTION OF THE PREFERRED EMBODIMENTS

Figure 1:
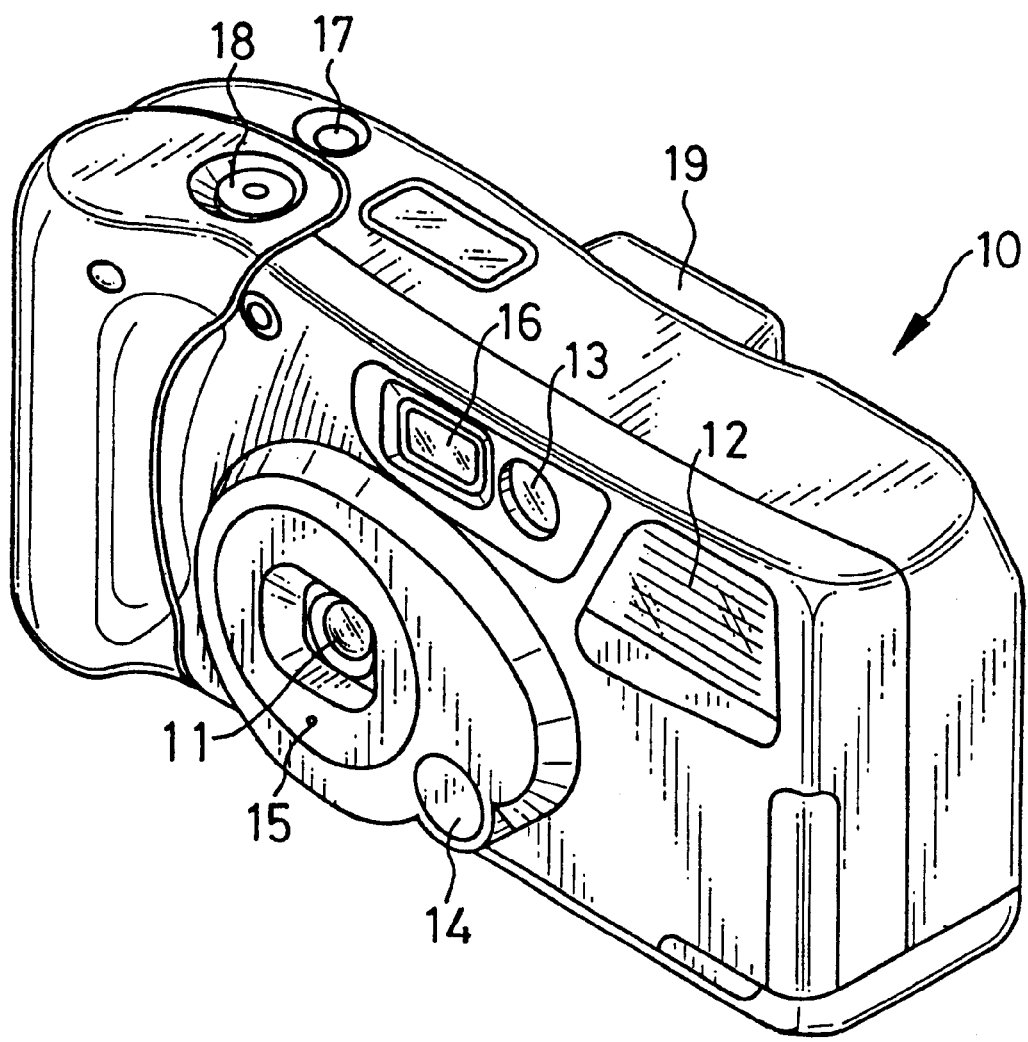
FIG. 1 is a perspective view of a compact camera having an exposure control device according to a preferred embodiment of the present invention.

FIG. 1 shows an example of camera having an exposure control device according to an embodiment of the present invention. The camera 10 is provided with a taking lens 11, a flash window 12, light projecting and receiving windows 13 and 14 for subject distance measurement, a light measuring window 15 for subject brightness measurement, and a finder objective window 16 which are disposed in a front side of the camera 10. The camera 10 also has a main power switch 17 and a shutter button 18 disposed on a top side thereof, and a finder eyepiece window 19 disposed on a rear side thereof. The main power switch 17 is turned on to supply power to respective circuits, so that the camera 10 gets ready for photography. Thereafter, when the shutter button 18 is depressed halfway while framing a subject through the finder windows 19 and 12, the distance and the brightness of the subject are automatically measured. When the shutter button 18 is further depressed to the full, a photographic filmstrip 21 is exposed through the taking lens 11.

Figure 2:
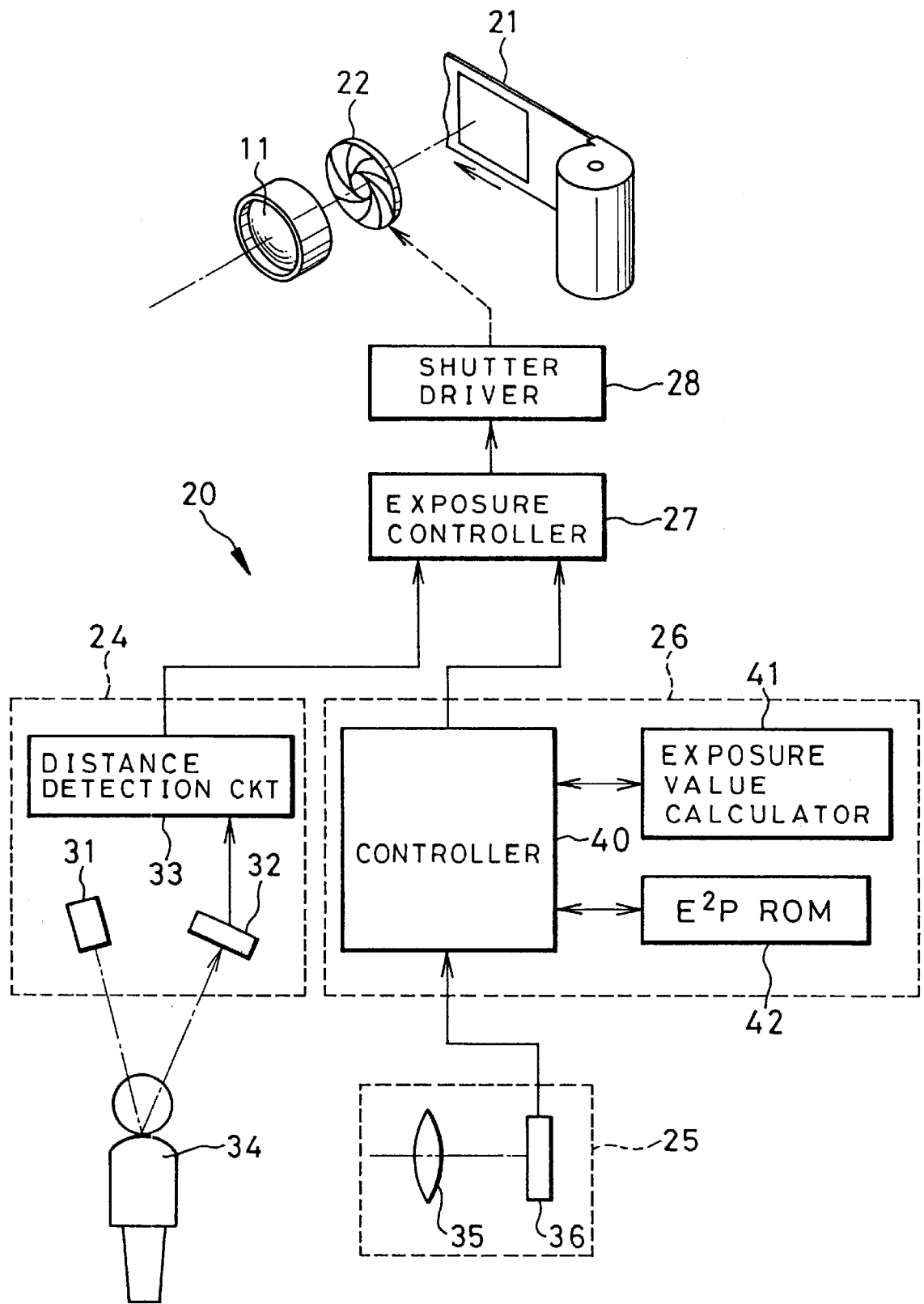
FIG. 2 is a functional block diagram of the exposure control device adopted in the camera shown in FIG. 1.

As shown in FIG. 2, a program shutter, e.g., an iris diaphragm type program shutter, 22 is disposed behind the taking lens 11. The program shutter 22 regulates the amount of exposure of the photographic filmstrip 21 under the control of the exposure control device 20. The exposure control device 20 is constituted of a distance measuring section 24, a brightness measuring section 25, an operation circuit 26, and an exposure controller 27. The exposure control device 20 adjusts the amount and the time of opening of the program shutter 22 through a shutter driver 28.

The distance measuring section 24 is an active-type range finder constituted of a light projector 31, a light receiver 32 and a distance detection circuit 33. The light projector 31 is disposed behind the light projecting window 13 to project infrared spotlight toward a main subject 34 such as a human subject. The light receiver 32 is disposed behind the light receiving window 14 to receive light reflected from the main subject 34, and output a signal whose level corresponds to the light amount received thereon. The distance detection circuit 33 outputs a distance signal in correspondence with the signal level from the light receiver 32.

Figure 3:
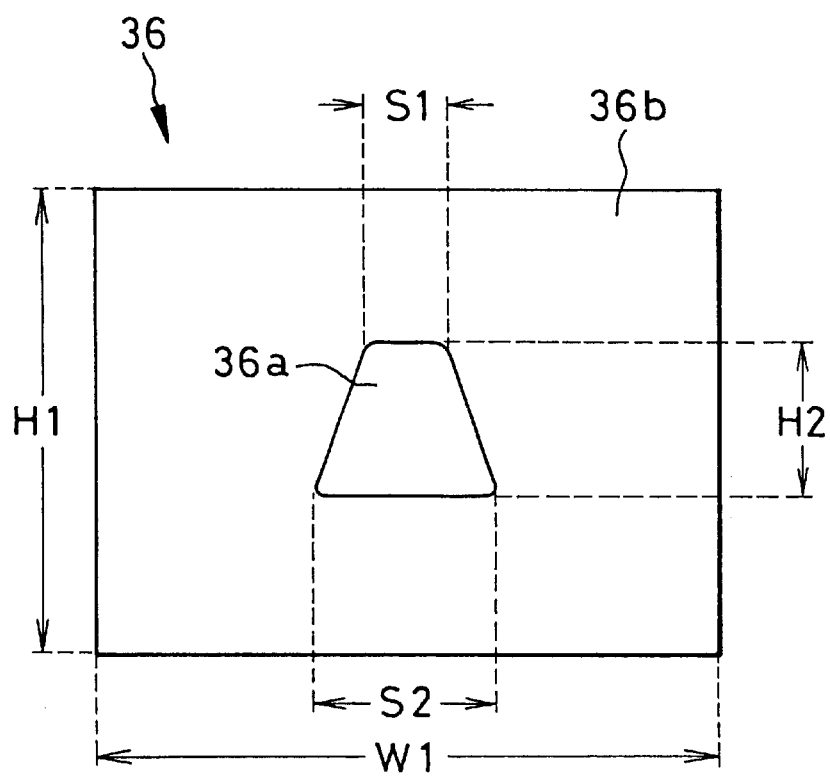
FIG. 3 is an explanatory view of a divisional photo-sensor of the exposure control device according to the embodiment.
Figure 4A:
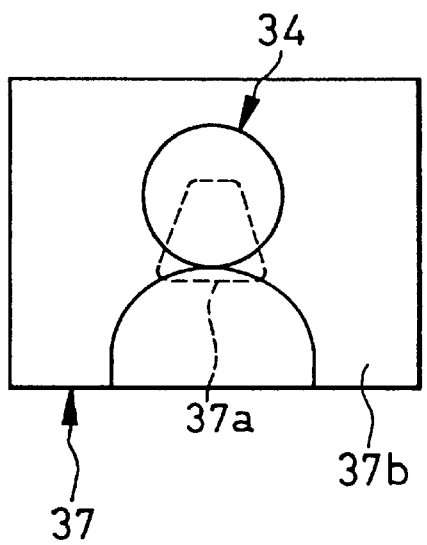
FIGS. 4A and 4B are explanatory views of images formed on the divisional photo-sensor at different subject distances from each other.
Figure 4B:
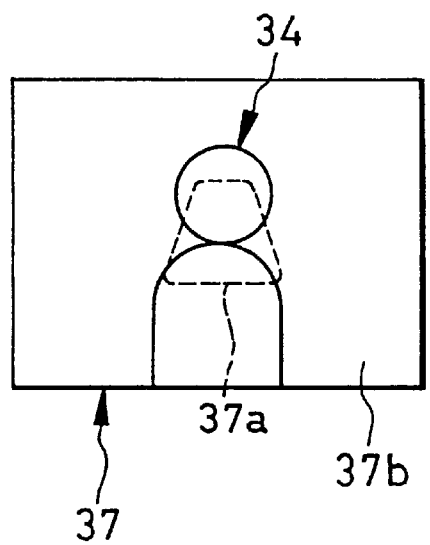

The light measuring section 25 is constituted of a lens 35 and a divisional photo-sensor 36 which are disposed behind the light measuring window 15. The lens 35 is designed to form an image of a photographic field viewed through the viewfinder on the divisional photo-sensor 36. The photo-sensor 36 is constituted of a central segment 36a and a peripheral segment 36b, as is shown in FIG. 3. The central segment 36a is disposed in and around the center of the photo-sensor 36, and has a trapezoid shape which is, for example, 0.2 mm in top side S1, 0.5 mm in bottom side S2 and 0.4 mm in height H2 while the photosensitive surface of the photo-sensor 36 is 1.9 mm in height H1 and 2.5 mm in width W1. This construction increases the probability of aiming the central segment 36a at the main subject 34. As shown in FIGS. 4A and 4B, an image 37 of a scene formed through the lens 35 on the divisional photo-sensor 36 is divided into a central photometric area 37a and a peripheral photometric area 37b in correspondence with the central segment 36a and the peripheral segment 36b of the photo-sensor 36, so that a light measurement signal is detected from each of the two photometric areas 37a and 37b, and is outputted individually from each of the two segments 36a and 36b.

The operation circuit 26 is constituted of a controller 40, an exposure calculator 41 and an EEPROM 42. The controller 40 converts the light measurement signals from the photo-sensor 36 into a central brightness or luminance value and a peripheral brightness or luminance value, and derives a central light value and a peripheral light value with respect to a given film speed, respectively from the central and peripheral brightness values. Depending upon the light values and a predetermined offset value δ, the controller 40 makes an judgment as to whether the scene to be photographed is front-lighted or back-lighted. The offset value δ is read from the EEPROM 42. Then, the exposure calculator 41 calculates an exposure value Es suitable for the main subject 34 on the basis of the central and peripheral light values from the controller 40 according to the following equation:

$$Es = \log_2[1-(1-\alpha)2^{LVb-LVa}] - \log_2 + LVa \quad (1)$$

wherein LVa represents a central light value, LVb represents a peripheral light value, and α represents a correction coefficient determined depending upon whether the scene is front-lighted or back-lighted in a manner as set forth below.

In most cases, regardless of the shape and the size of the central segment 36a of the divisional photo-sensor 36, part of the background is merged with part of the main subject in the central photometric area 37a, for example, as shown in FIGS. 4A and 4B. Accordingly, the relationship between a light value LVa of a central photometric area, a light value LVb of a peripheral photometric area, a light value LVc of a main subject, and a light value LVd of a background can be generally shown by the following equation:

$$2^{LVa} = X\alpha 2^{LVc} + (1+X\alpha)2^{LVd} \quad (2)$$

wherein Xα represents an occupation rate or share of the main subject in the central photometric area.

However, since the share of the primary subject in the peripheral photometric area is mostly very small, the peripheral light value LVb may be held substantially equal to the background light value LVd. Then, the following equation should hold:

$$2^{LVc} = X\alpha 2^{LVc} + (1-X\alpha)2^{LVb} \quad (3)$$

The equation (3) may be rewritten as follows:

$$2^{LVc} = [2^{LVa} - (1-X\alpha)2^{LVb}]/X\alpha \quad (4)$$

Therefore, the light value LVc of the main subject can be obtained by the following equation:

$$LVc = \log_2 \{2^{LVa} - (1 - X\alpha)2^{LVb}\}/X\alpha \quad (5)$$
$$= \log_2 \{1 - (1 - X\alpha)2^{LVb-LVa}\} - \log_2 X\alpha + LVa$$

Since the main subject light value LVc corresponds to an optimum exposure value for the main subject, it is preferable to use the equation (5) for calculating an exposure value Es. Therefore, by substituting the main subject light value. LVc and the correction coefficient α for the exposure value Es and the occupation rate Xα of the equation (5), respectively, the equation (1) is formed.

Accordingly, the correction coefficient α should preferably be set as equal to an actual occupation rate of the main subject 34 in the central photometric area 37a as possible, and hence should be variable depending upon the shape and size of the central photometric area. According to a preferred embodiment of the invention, a correction coefficient α1 for front-lighted scenes, e.g. 1, and a correction coefficient α2 for back-lighted scenes, e.g. 0.96, are stored in the EEPROM 42. The values of the correction coefficients α1 and α2 are predetermined by calculating an average occupation rate of various main subjects in the central photometric area 37a with respect to thousands of scenes, so as to obtain a moderately exposed main subject in any kind of photograph.

The exposure controller 27 determines an aperture size and an exposure time as a magnitude and a time duration of opening of the program shutter 22 on the basis of the exposure value Es calculated by the exposure calculator 41 and a subject distance K represented by the distance signal from the distance measuring section 24, and drives the program shutter 22 correspondingly through the shutter driver 28.

Figure 5:
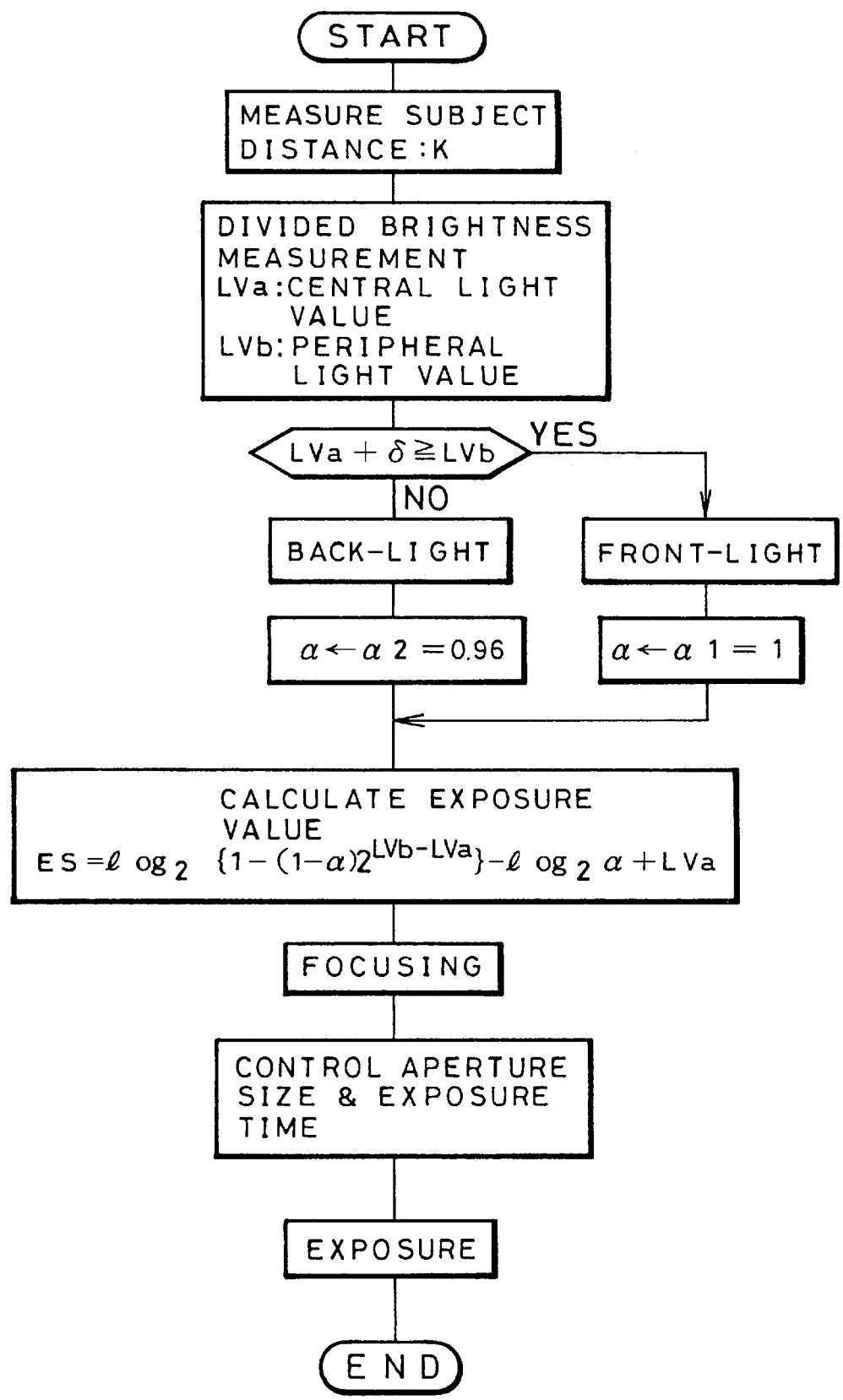
FIG. 5 is a flow chart illustrating the operation of the exposure control device shown in FIG. 2.

FIG. 5 shows the sequence of operation of the above-described exposure control device 20. Upon half depression of the shutter button 18, the distance measuring section 24 measures the subject distance K, and simultaneously, the light measuring section 25 outputs light measurement signals to the controller 40, which are detected separately from the central photometric area 37a and the peripheral photometric area 37b of the image 37.

In the operation circuit 26, the controller 40 determines a central light value LVa and a peripheral light value LVb on the basis of the light measurement signals for the photometric areas 37a and 37b. Thereafter, the controller 40 judges whether the scene is front-lighted or back-lighted by comparing the peripheral light value LVb with a value formed by adding the offset value δ to the central light value LVa. That is, when the value LVa+δ is less than the peripheral light value LVb, the scene is judged to be front-lighted. Then, the controller 40 reads the correction coefficient α1 from the EEPROM 42. When the value LVa+δ is not less than the peripheral light value LVb, the scene is judged to be back-lighted, and the controller 40 reads the correction coefficient α2 from the EEPROM 42. According to the present embodiment, the offset value δ is an appropriate value not more than 3.0, and is stored in the EEPROM 42.

Thereafter, the controller 40 activates the exposure calculator 41 to calculate an exposure value Es from the central and peripheral light values LVa and Lvb and the selected correction coefficient α1 or α2 using the equation (1). The calculated exposure value Es is sent to the exposure controller 27.

The exposure controller 27 determines a magnitude and a time of opening of the program shutter 22 so as to expose the photographic filmstrip 21 in correspondence with the exposure value Es. When the shutter button 18 is further depressed to the full, the shutter driver 28 drives the program shutter 22 to open for the determined time in the determined magnitude. When the program shutter 22 is driven in order, a latent image is recorded on the photographic filmstrip 21 containing a properly exposed main subject image.

Although the above-described embodiment assigns a predetermined value as the correction coefficient $\alpha 1$ or $\alpha 2$ for the front-light or the back-light photography, respectively, it is more preferable to make the correction coefficient $\alpha$ variable depending upon the subject distance K. This is because the size of the same main subject 34 contained in the image 37 and hence the occupation rate of the same main subject 34 decreases with increase of the subject distance K, for example, as shown in FIGS. 4A and 4B.

FIG. 6A is a table showing the results of an experiment wherein light values LVa and LVb were measured in the central and the peripheral photometric areas 37a and 37b while changing the subject distance K with respect to a back-lighted subject. Also, light values LVc and LVd of the main subject and the background, which were measured by using an exposure meter, are shown as comparative values. FIG. 6B is a graph illustrating the relationship between the light values LVa, LVb, LVc and LVd shown in FIG. 6A.

As shown in the graph of FIG. 6B, the main subject light value LVc has an approximately constant value independently of the subject distance K. On the other hand, the central light value LVa takes higher values than the value LVc in the whole distance range, and increases with the subject distance K.

In order to modify the value LVa to approach to the actual subject light LVc, the following equation (6), which is obtained from the equation (2), may be used to determine the correction coefficient:

$$\alpha = (2^{LVa} - 2^{LVd})/(2^{LVc} - 2^{LVd}) \qquad (6)$$

FIG. 6C shows the values of the correction coefficient $\alpha$ calculated according to the equation (6) for those subject distance values K sampled in FIG. 6A, using corresponding central light values LVa shown in FIG. 6A. As for the main subject light value LVc and the background light value LVd, the values measured at the subject distance K=0.7 m are used for calculation. Since the values of correction coefficient $\alpha$ shown in FIG. 6C are obtained based on the measurement values for a back-lighted subject, these values are effective for back-light photography.

By previously memorizing table data representative of the relationship between the subject distance K and the correction coefficient $\alpha$ in the EEPROM 42, the exposure value Es suitable for the main subject 34 may be calculated according to the equation (1) while selecting an appropriate value of the correction coefficient $\alpha$ with reference to the table data. Since the relationship between the subject distance K and the correction coefficient $\alpha$ varies depending upon the camera type, the shape and the size of its photometric area, it is preferable to determine appropriate table data on the basis of a large number of actual light measurement data under various photographic conditions.

Figure 7:
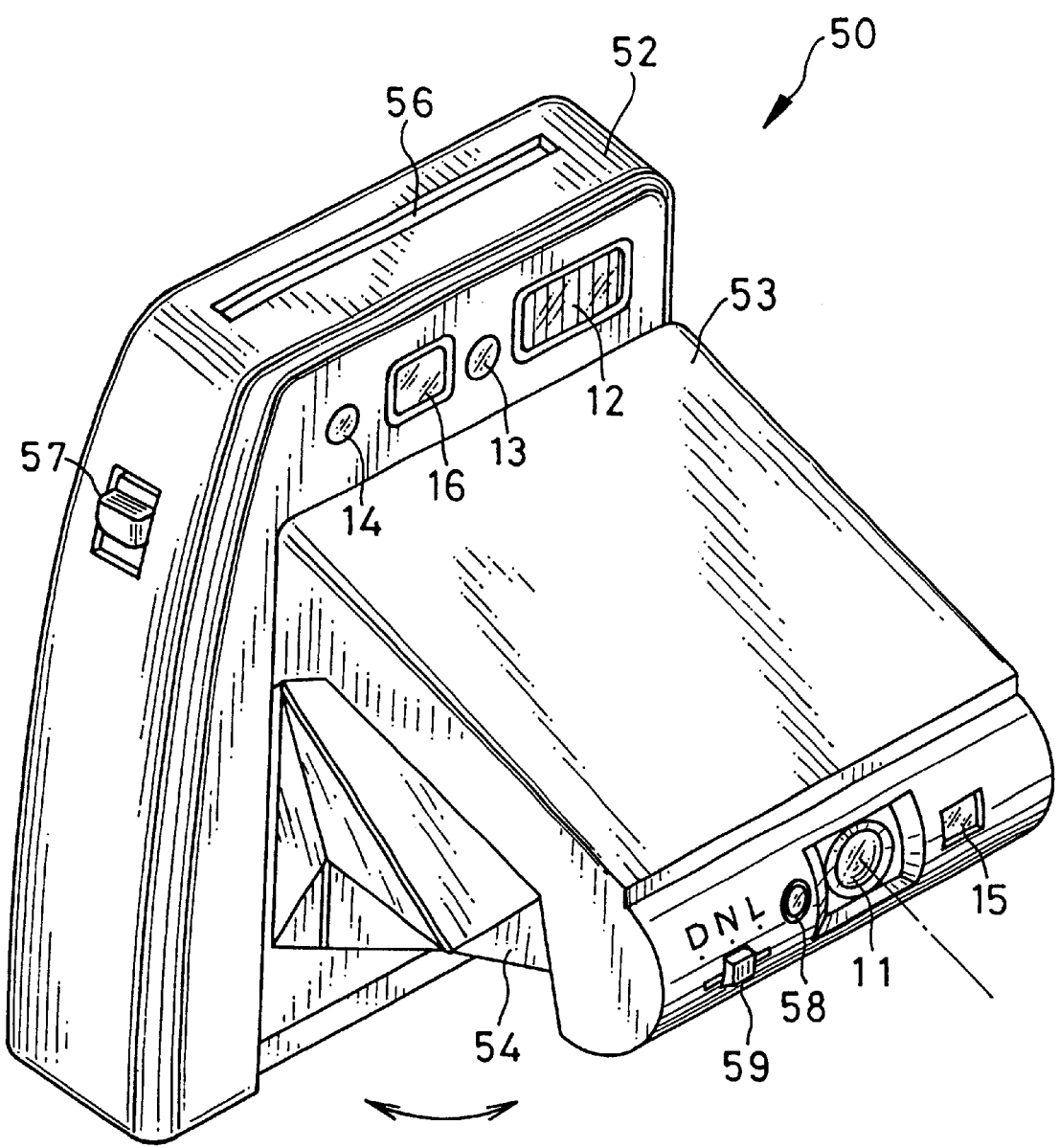
FIG. 7 is an instant camera using an exposure control device according to a second preferred embodiment of the present invention.

FIG. 7 shows an instant camera 50 having an exposure control device according to another preferred embodiment of the invention, which projects a variable amount of flash light on every exposure. The instant camera has a main body 52 to which a lens board 53 is mounted movable between an operational position as shown in FIG. 7 and a rest position substantially aligned with a front wall of the main body 52. Bellows 54 are provided to cover an under side of the lens board 53. The main body 52 has a flash window 12, a finder objective window 16, a shutter button 57, and light projecting and receiving windows 13 and 14 for an active range finding mounted thereon. An ejection slot 56 is formed through a top side of the main body 52 to eject a sheet of photographic film after exposure while developing it in a conventional manner.

A taking lens 11, a light measuring window 15, a flash light receiving window 58, and a density control knob 59 are disposed on a front end portion of the lens board 53. The taking lens 11 is automatically moved by a motor or the like to set in a position corresponding to a subject distance signal detected from the range finding device. A shutter mechanism 61, including an iris diaphragm type program shutter as shown in FIG. 2, is disposed behind the taking lens 11.

Light entering through the light measuring window 15 is focused on a divisional photo-sensor 36 having a trapezoid central segment 36a and a peripheral segment 36b in the same way as shown in FIG. 3, to form an image of a scene to be photographed, correspondingly to a picture frame.

Figure 8:
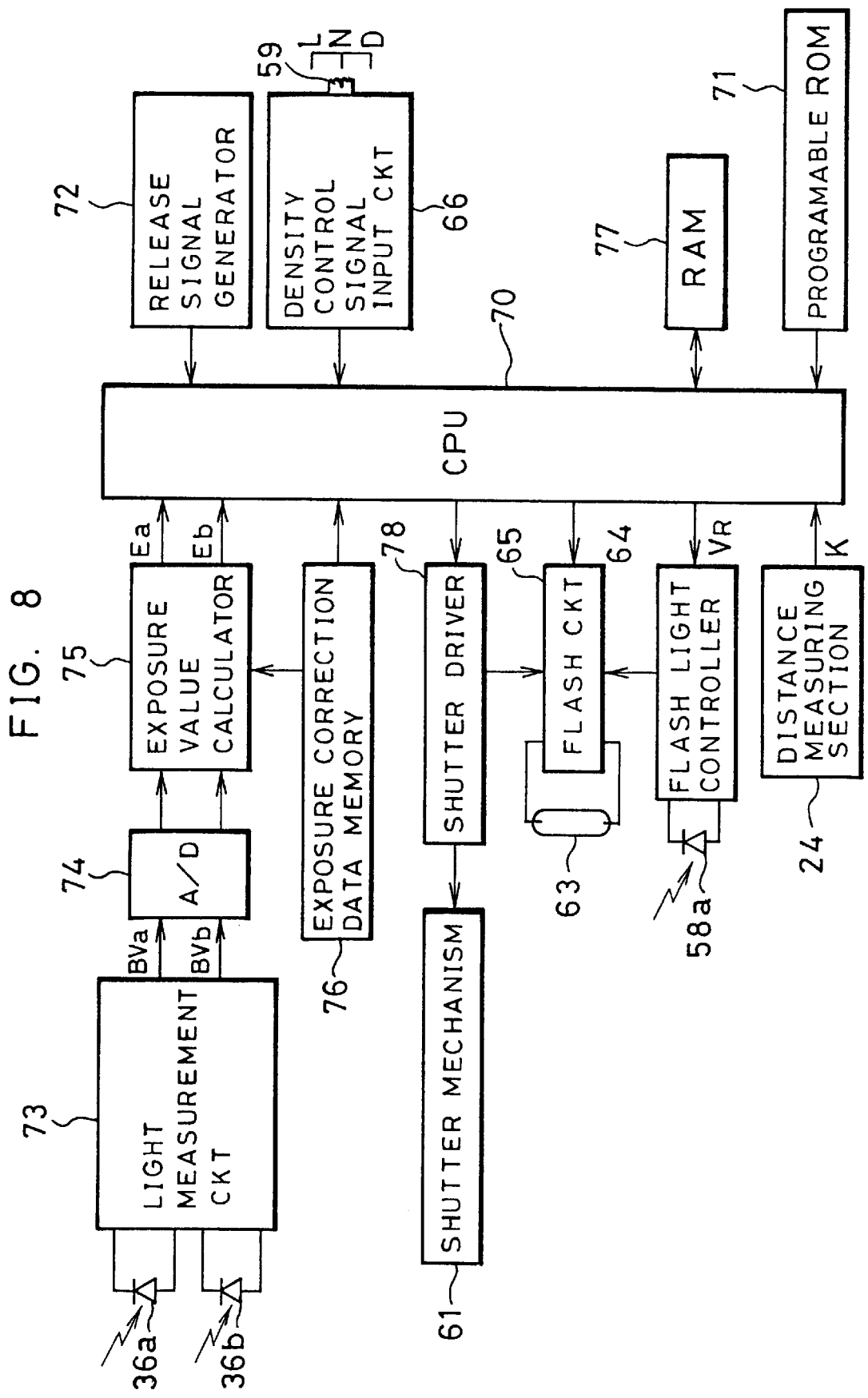
FIG. 8 is a block diagram of the exposure control device of the second embodiment.

As shown in FIG. 8, a photoelectric element 58a is disposed behind the flash light receiving window 58 to detect light projected from a flash discharge tube 63 and reflected from a subject. The photoelectric element 58a is connected to a flash light controller 64 so that the flash light controller 64 outputs a flash stop signal to a flash circuit 65 to stop the flash discharge tube 63 from emitting when the integral value of flash light amount reaches a predetermined light control level. The light control level may be appropriately changed to regulate flash light amount.

The density control knob 59 is manually operable to change the density of photo-prints between a normal (N) tone, a dark (D) tone and a light (L) tone by setting the knob 59 in one of three positions indicated by "N", "D" and "L". When the knob 59 is set in the "D" position, a corresponding density control signal D is inputted in a CPU 70 through a density control signal input circuit 66 so that an exposure value is automatically modified to obtain a relatively underexposed photograph. When the knob 59 is set in the "L" position, a corresponding density correction signal L is inputted to the CPU 70 so that an exposure value is automatically modified to obtain a relatively over-exposed photograph.

The CPU 70 controls the above and other sections of the camera to execute an exposure control according to a sequence program stored in a program memory 71 constituted of a ROM. When a release signal generator 72 outputs a signal indicating that the shutter button 57 is depressed halfway, a light measurement circuit 73 detects light measurement signals respectively from the central segment 36a and the peripheral segment 36b. The light measurement signals are converted through an A/D converter 74 into digital data representative of a central light value LVa and a peripheral light value LVb, and then inputted in an exposure calculator 75.

The exposure calculator 75 first makes an judgment based on the light values LVa and LVb as to whether the scene to be photographed is front-lighted or back-lighted. Depending upon this judgment, the exposure calculator 75 reads appropriate exposure correction data from an exposure correction data memory 76, and calculates a central exposure value Ea based mainly on the central light value LVa, and a peripheral exposure value Eb based mainly on the peripheral light taking other parameters including ISO speed into consideration in both cases. The exposure correction data memory 76 is constituted of an EEPROM which may be rewritten with appropriate data during the manufacture. The central and peripheral exposure values Ea and Eb are sent to the CPU 70 to be stored in a RAM 77.

The CPU 70 calculates an effective exposure value E based on the central and peripheral exposure values Ea and Eb in accordance with an exposure calculation sequence stored in the ROM 71, as will be described in detail below. The effective exposure value E is a control value for controlling the shutter mechanism 61. Basically, the effective exposure value E is determined higher than both exposure values Ea and Eb, so that, when the shutter mechanism 61 is driven in correspondence with the effective exposure value E, an under-exposed photograph would be produced without flash light.

The shutter mechanism 61 is driven through a shutter driver 78 which counts clock pulses from the start of each shutter release or opening operation, so as to check the size or diameter of an aperture formed through the iris diaphragm type shutter, and outputs a trigger signal to the flash circuit 65 when the aperture size takes a value determined in the CPU 70.

The flash circuit 65 causes the flash discharge tube 63 to flash light in response to the trigger signal, and stops the flash discharge tube 63 from flashing in response to a flash stop signal outputted from a flash light controller 64. The flash light controller 64 integrates the amount of light detected by the photoelectric element 58a, to output the flash stop signal when the integrated light amount VS reaches a light control level VR determined in the CPU 70.

A distance measuring section 24 outputs a distance signal corresponding to a subject distance K based on light projected through the light projecting window 13 and received through the light receiving window 14. Since it depends upon the subject distance whether flash light has effect on the exposure or not, the CPU 70 takes the subject distance K into consideration when calculating the effective exposure value E. Also, the density control signal N (normal), L (light) or D (dark) inputted through the density control signal input circuit 66 is taken into account when calculating the effective exposure value E.

Figure 9:
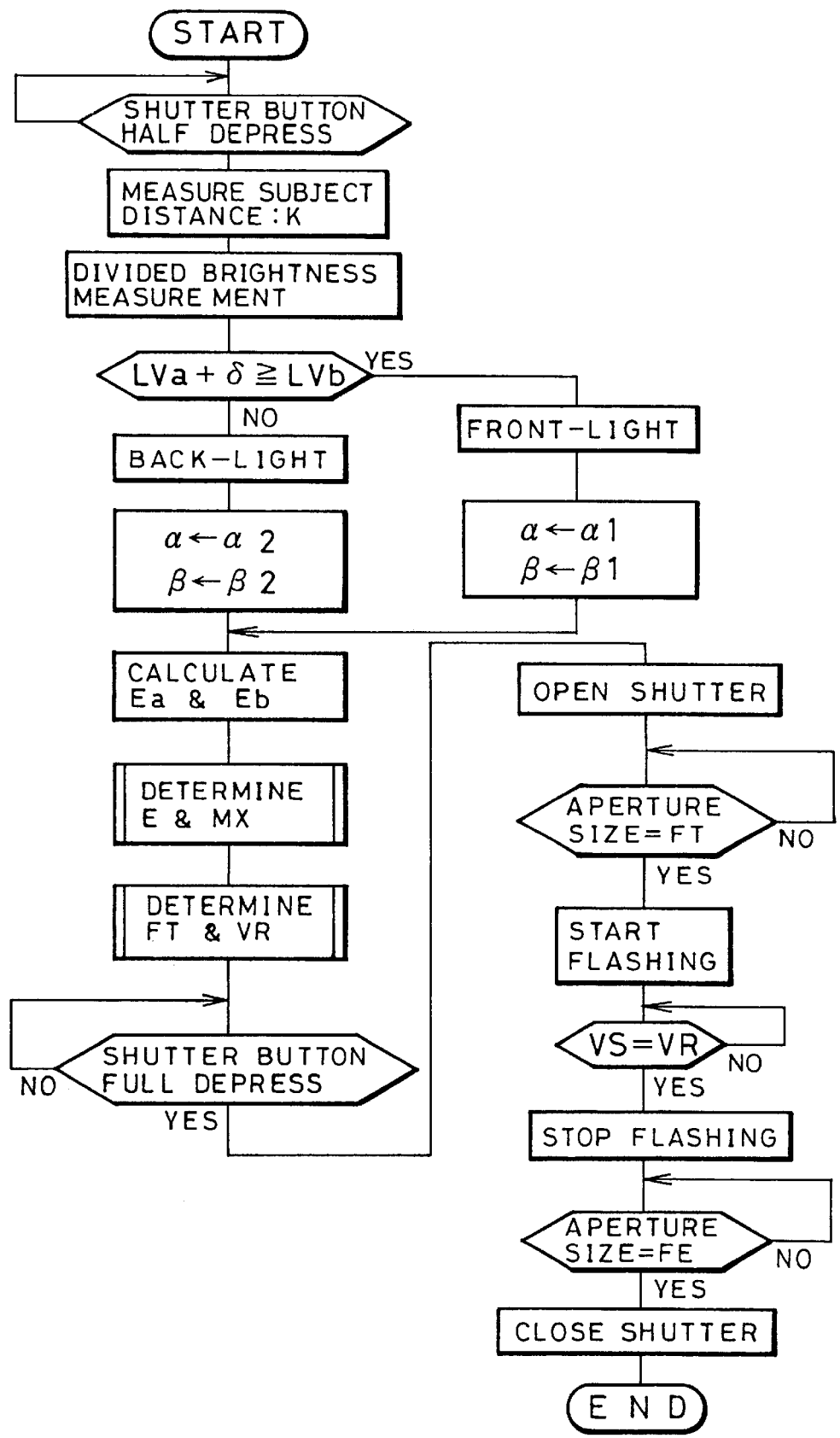
FIG. 9 is a flow chart illustrating the operation of the exposure control device shown in FIG. 8.
Figure 10A:
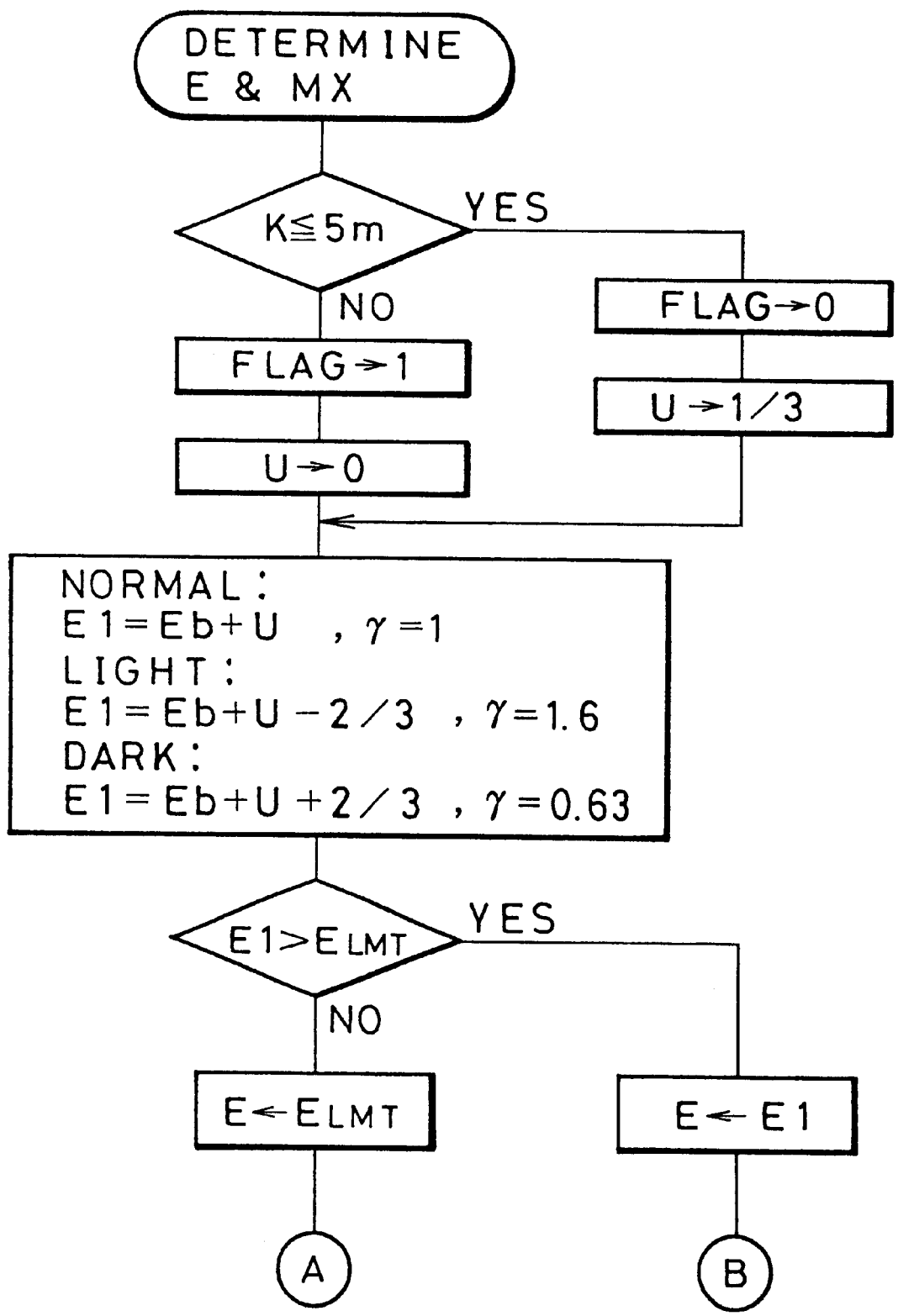
FIGS. 10A and 10B show a flow chart of a subroutine for determining an effective exposure value and a mix rate, included in the main routine shown in FIG. 9.
Figure 10:
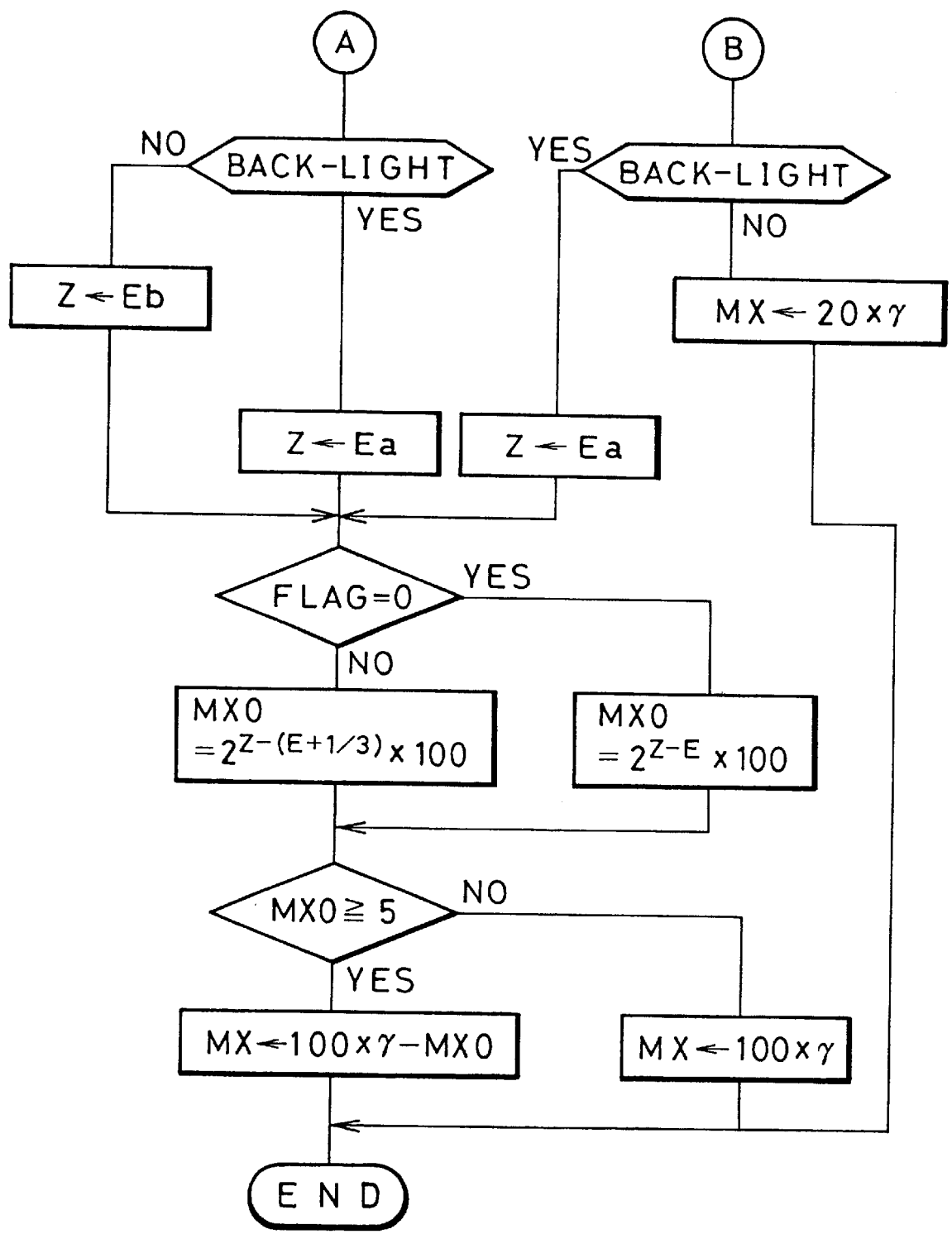

The operation of the exposure control device according to the embodiment shown in FIG. 8 will be described with reference to FIGS. 9 to 11.

Upon half-depression of the shutter button 57, a subject distance signal and light measurement signals are photoelectrically detected by the central segment 36a and the peripheral segment 36b, and are converted into a central brightness value BVa and a peripheral brightness value BVb through the light measurement circuit 73. The exposure value calculator 75 converts the central and peripheral brightness values BVa and BVb into central and peripheral light values LVa and LVb, respectively, with respect to a given film speed. Simultaneously, the exposure value calculator 75 reads the offset value δ from the exposure correction data memory 76 to determine whether the photographic scene is front-lighted or back-lighted, by comparing the peripheral light value LVb with a value formed by adding the offset value δ to the central light value LVa. That is, when the value LVa+δ is less than the peripheral light value LVb, the scene is judged to be front-lighted. When the value LVa+δ is not less than the peripheral light value LVb, the scene is judged to be back-lighted. According to the present embodiment, the offset value δ is one of predetermined values set within a range from Lv 0 to 3 at intervals of Lv ¼ (0.25), and is selected in correspondence with the central light value LVa.

The exposure calculator 75 refers to the exposure correction data memory 76 again, to determine correction coefficients α and β to be used in calculation of the central and peripheral exposure values Ea and Eb, in accordance with whether the scene is back-lighted or front-lighted. According to the present embodiment, "1.00" and "0.19" are determined as correction coefficients α1 and β1 for front-lighted scenes, whereas "0.96" and "0.69" are determined as correction coefficients α2 and β2 for back-lighted scenes.

The correction coefficients α and β are intended to take account of the fact into exposure calculation that the brightness value detected by the central segment 36a is not equal to the subject brightness but affected in some measure by the background brightness. Therefore, the values of the correction coefficients α and β may be statistically predetermined based on thousands of actual photographs. According to the present embodiment, it is preferable to determine the correction coefficient α2 in a range from 0.825 to 1.00, and the correction coefficients β1 and β2 in a range from 0 to 1. It is also preferable to vary the correction coefficients α and β depending upon the subject distance or in accordance with the offset value δ.

After the correction coefficients α and β are thus determined, the central exposure value Ea and the peripheral exposure value Eb are calculated according to the following equations:

$$Ea = \log_2[1-(1-\alpha)2^{LVb-LVa}] - \log_2 \alpha + LVa \quad (7)$$

$$Eb = \log_2[\beta 2^{LVa-LVb} + (1-\beta)] + LVb \quad (8)$$

The central exposure value Ea is a value at which a central area of a consequent photograph would be properly exposed without flash light both for front-lighted scenes and for back-lighted scenes, and is determined mainly based on the central light value LVa while taking consideration of the peripheral light value LVb. On the other hand, the peripheral exposure value Eb is a value at which the exposure amount of a consequent photograph would be proper in total without flash light, whereas a central area of the photograph would not remarkably deviate from an optimum exposure condition, especially when the scene is front-lighted.

The central and peripheral exposure value Ea and Eb are once stored in the RAM 77 through the CPU 70. Then, according to a sub-routine shown in FIGS. 10A and 10B, the CPU 70 determines an effective exposure value E as a control value for the shutter mechanism 61, and a mix rate MX representative of a rate or percentage of flash light amount to be contributed to the total exposure amount. For example, if the mix rate MX=20, the flash light amount should contribute to 20% in the necessary exposure amount, whereas the effective exposure value E should correspond to 80% of the exposure amount.

First, the subject distance K is compared with a predetermined value, e.g., 5 m. When the subject distance K is more than 5 m, a flag "1" is set in the RAM 77 to indicate that the main subject is disposed beyond a flash effective range in which the flash light is fully effective. When the subject distance K is not more than 5 m, a flag "0" is set in the RAM 77 to indicate that the main subject is in the flash effective range. Responsive to the flag "0", a value "⅓" is assigned for an under-biasing value U which serves to bias the exposure value toward under-exposure side. When the flag "1" is set, the under-biasing value U is set to "0".

Then, a preliminary exposure value El is calculated based on the under-biasing value U and the peripheral exposure value Eb, as well as depending on the density control signal N (normal), L (light) or D (dark) from the density control signal input circuit 66. Specifically, when the density control signal is N, the preliminary exposure value El is calculated by adding the under-biasing value U to the peripheral exposure value Eb. Therefore, with the under-biasing value U=0, the value El is equal to the value Eb. With the under-biasing value U=⅓, the value El is set ⅓ LV higher than the value Eb so that a correspondingly under-exposed photograph would be produced if the shutter mechanism 61 is driven in accordance with the value El without flash light.

When the density control signal L is inputted, the preliminary exposure value El is set ⅔ LV lower than the value Eb+U to obtain a larger exposure amount in comparison with the case where the density control signal N is inputted. On the contrary, when the density control signal D is inputted, the preliminary exposure value El is set ⅔ LV higher than the value Eb+U to obtain a smaller exposure amount compared with the case where the density control signal is N. Depending on the density control signal N, L or D, also a light amount control coefficient Γ is determined, which used for determining the mix rate MX as set forth below.

After the preliminary exposure value El is determined in this way, the value El is compared with a limit exposure value $E_{LMT}$ which corresponds to an exposure time, e.g., ¹⁄₄₅ sec., beyond which camera-shake is very likely to occur. If, therefore, an exposure time corresponding to the preliminary exposure value El is longer than ¹⁄₄₅ sec., the limit exposure value $E_{LMT}$ is selected as the effective exposure value E. Otherwise, the value El serves as the effective exposure value E.

When El≦$E_{LMT}$, as it means that the subject brightness is quite low, an ordinary flash photography using a flash light as a main illumination light on exposure, is executed while setting the effective exposure value E at the limit exposure value $E_{LMT}$. When El>$E_{LMT}$, even though it means that the subject brightness does not need a flash light, a day-light synchronized flash photography is executed while setting the effective exposure value E at the preliminary exposure value El. In either case, the amount of flash light to be supplemented is calculated as the mix rate MX in accordance with the sequence shown in FIG. 10B.

Specifically, if El>$E_{LMT}$ and the scene is front-lighted, the mix rate MX=20 ×Γ. If El>$E_{LMT}$ and the scene is back-lighted, the central exposure value Ea is assigned for a coefficient Z which is used in calculating a preliminary mix rate MXO. If El<$E_{LMT}$ and the scene is front-lighted, the peripheral exposure value Eb is assigned for the coefficient Z. If El≦$E_{LMT}$ and the scene is back-lighted, the central exposure value Ea is assigned for the coefficient Z. Then, the preliminary mix rate MXO is determined based on the value E and Z.

If the subject distance K≦5 m, MXO=$2^{Z-E}$×100. If the subject distance K>5 m, MXO=$2^{Z-(E+⅓)}$×100. Depending upon whether the calculated preliminary mix rate MXO is less than 5 m or not, the mix rate MX is determined to be 100×Γ or 100×Γ−MXO, respectively. In this way, the effective exposure value E and the flash light amount is always determined in combination with each other to achieve an optimum exposure amount in totality.

Figure 11:
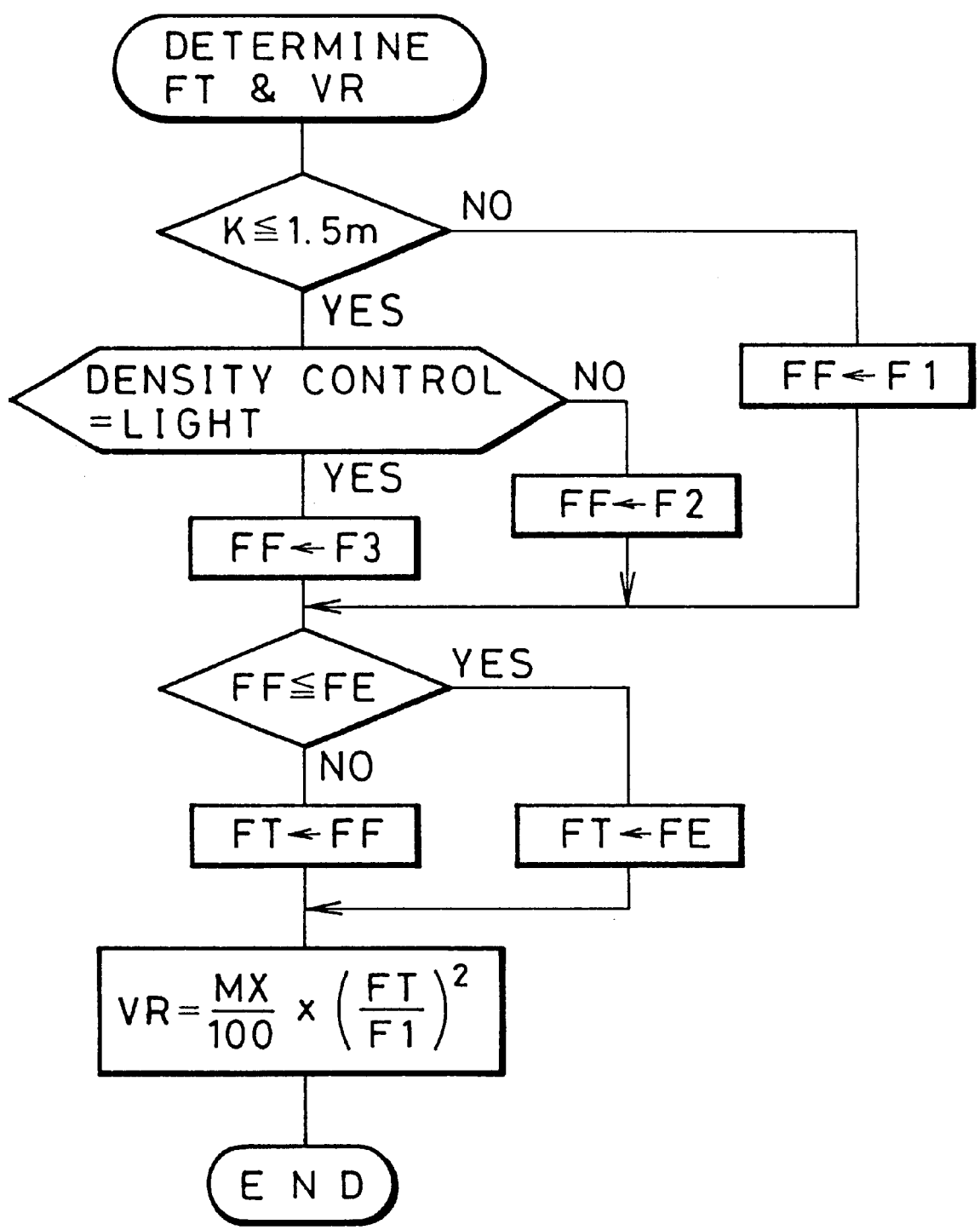
FIG. 11 is a flow chart of a subroutine for determining a flash start time and a light control level, included in the main routine shown in FIG. 9.

In correspondence with the effective exposure value E and MX determined as above, flash start time data FT and a light control level VR for controlling start and stop of flashing are determined according to a sequence shown in FIG. 11. The flash start time data FT is determined as a f-number corresponding to an aperture size or diameter of the iris diaphragm type shutter, at which flash light should start being projected. That is, the moment when the shutter mechanism 61 comes to that aperture size represented by the data FT, a trigger signal should be applied to the flash circuit 65. Because a peak aperture size of the program shutter is defined by the effective exposure value E, a f-number FE corresponding to the effective exposure value E may be definitely determined in accordance with the effective exposure value E. Also, because the present aperture size of the shutter can be detected as a time duration from the start of the shutter actuation, it is possible to control the flash timing with respect to a given f-number FT by counting drive pulses applied to the shutter driver 78 for shutter actuation.

As shown in FIG. 11, first a basic flash time value FF is determined depending upon whether the subject distance K is more than 1.5 m or not, as well as whether the density control signal is L or not. If the subject distance K>1.5 m, a first value F1 is determined as the basic flash time value FF, wherein the first value F1 corresponds to a maximum or fully-opened aperture size of the shutter mechanism 61. If the subject distance K≦1.5 m and the density control signal is other than L, a second value F2 is determined as the basic flash time value FF. If K≦1.5 m and the density control signal is L, a third value F3 is determined as the basic flash time value FF. For example, the first to third values F1, F2 and F3 are f-11, f-19 and f-16 in case where Ev 11, Ev 12 and Ev 13 correspond to f-15.3, f-17.4 and f-25.2, respectively. These values F1, F2 and F3 are predetermined such that the efficiency of flash light on a subject will not be too lowered in a farther range than 1.5 m, and will not be too large in a nearer range than 1.5 m. Accordingly, even a near main subject would not be over-exposed.

Finally, between the basic flash time value FF and the f-number FE corresponding to the effective exposure value E, one that represents a smaller aperture size or diameter is decided to be used as the flash start time data FT. Thereafter, the light control level VR is determined in accordance with the following equation:

$$VR=(MX/100)\times(FT/F1)^2 \qquad (9)$$

All the control data determined as set forth above is stored in the RAM 77, to be read on executing a photographic sequence. The value FT is stored as the number of drive pulses to be supplied from the start of shutter actuation to the flash start time when the shutter mechanism reaches the corresponding aperture size.

Referring again to FIG. 9, the photographic sequence starts in response to a shutter release signal outputted from the shutter release circuit 72 to the CPU 70 upon full depression of the shutter button 7. Then, the CPU 70 starts supplying the drive pulses to the shutter driver 78 to actuate the shutter mechanism 61. When the number of drive pulses reaches the number corresponding to the value FT, the shutter driver 78 outputs a trigger signal to the flash circuit 65 to cause the flash discharge tube 63 to flash.

The flash light projected from the tube 63 and reflected from the subject falls on the photoelectric element 58a, so that the flash light controller 64 integrates the light amount in form of a voltage VS on a capacitor. When the voltage VS reaches the light control level VR, the flash light controller 64 outputs a flash stop signal to the flash circuit 65 to stop flashing. Meanwhile, the shutter mechanism 61 continues to be opened up to the aperture size corresponding to the value FE, and then closed. Therefore, in case FT=FE, the shutter driver 78 starts closing concurrently with the flash start.

FIG. 12 shows control values resulted from the above-described sequence with respect to several concrete central and peripheral light values, using the offset value δ=1.5, the correction coefficients α1=1, β1=0, α2=0.19, β2=0.69, when the film speed is ISO 100, the subject distance K≦5 m, and the density control knob 59 is set at the normal (N) position. It is to be noted that the light control level VR is clipped within a range from 0.2 to 3 V.

As shown in FIG. 12, flash photography at a mix rate of 20% is executed even for front-lighted subjects having a high brightness that does not need supplementary illumination, so that the exposure will be satisfactory to both main subject and background or other subsidiary subjects. Since the aperture size and the shutter speed are determined in accordance with a higher brightness value than the actual subject brightness correspondingly to the mix rate of flash light, not only camera-shake is prevented, but also the depth of field is enlarged in comparison with a non-flash photography. Therefore, also the focusing condition of the photograph will be improved.

For a back-lighted scene, flash photography is executed at an increased mix rate based on the central exposure value Ea to obtain an optimum exposure for the main subject, while adjusting the effective exposure value E for the shutter mechanism 61 to the peripheral exposure value Eb so as to obtain a reasonable exposure for the background. Since the exposure control operation is basically common to any kind of scenes including back-lighted and front-lighted scenes, a simple program software is enough.

If the calculated preliminary exposure value El is less than the limit exposure value $E_{LMT}$, since it means that camera-shake could occur with the preliminary exposure value El, the shutter mechanism 61 is controlled at the limit exposure value $E_{LMT}$ while adjusting the mix rate MX to the value $E_{LMT}$ in combination with the central or peripheral exposure value Ea or Eb, so that the exposure amount is always maintained proper.

Meanwhile, program shutters are widely used in recent instant cameras and compact cameras. The program shutter makes an exposure according to a combination of aperture value (Av) and shutter speed (Tv) which is determined in accordance with an exposure value (Ev). Generally, the program shutter has two or more shutter blades which are actuated by a motor or the like to open and close at once. In most program shutter, the exposure control is effected by controlling open time of the shutter blades in accordance with the exposure value.

Figure 26:
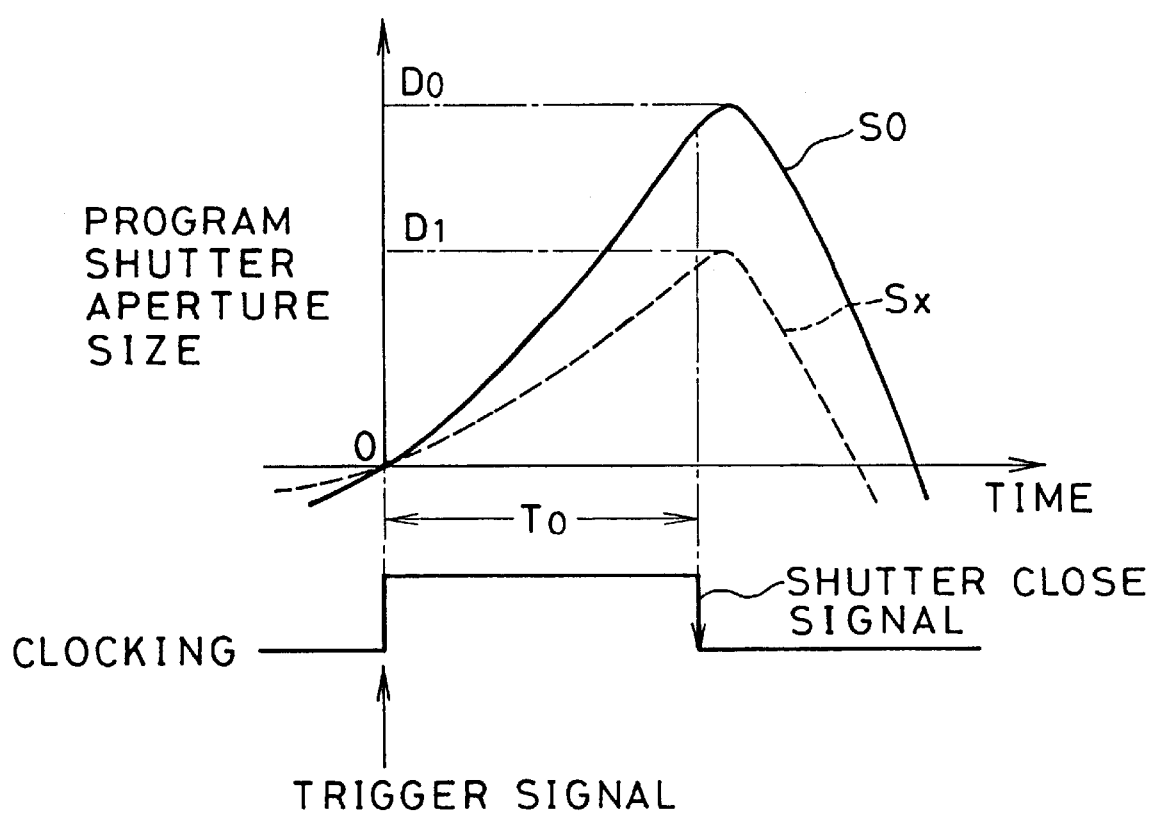
FIG. 26 is a graph illustrating a conventional exposure time control method.

For example, as shown in FIG. 26, in case an open time To is definitely determined in accordance with an exposure value, the shutter drive motor starts rotating in a forward direction upon a shutter release operation, to cause the shutter blades to move in an opening direction. The moment when the shutter blades reach a reference position, which is detected by a photo-sensor or the like, a trigger signal is generated to start clocking or timing the open time To. In this instance, the reference position is a position of the shutter blades, called pin-hole position, at which the exposure starts or a very small aperture as called pin-hole is being formed. The reference position may be a position around the pin-hole position, assuming that the open time To is determined taking the distance of the reference position from the pin-hole position.

The moment when the open time To has been clocked up, a shutter close signal is generated. Responsive to the shutter close signal, the motor starts rotating a reverse direction to close the shutter blades. The shutter blades is thus returned to an initial closed position through the pin-hole position. In this way, an exposure is accomplished. As shown by a curve S0, the shutter blades move a little further in the opening direction after the shutter close signal, because of inertia and the like. Of course, the exposure continues after the open time To till the shutter blades are completely closed. Therefore, the open time To is determined taking account of the exposure amount expected to be provided in and after the open time To. Since the above conventional method permits obtaining an appropriate exposure amount by setting only the open time To in accordance with the exposure value, the construction for exposure control can be simple. Moreover, the shutter close signal can serve as a flash trigger signal.

However, the conventional method has a problem in view of the fact that the shutter blades do not always move at the same speed in practice. For example, when the camera posture is changed, friction between the shutter blades as well as between a shutter base plate and the shutter blades can change. In addition to the friction change, variance and aging of individual shutter blades, variation in circumstance, and so forth can cause the variation in moving speed of the shutter blades. This problem can be difficult to solve especially when the shutter drive motor should be compact and should consume less energy, and hence has a limited driving power.

If the shutter blades moving speed is lowered for some reason, shutter operation characteristics would be changed as shown by a curve Sx when actuated with the same open time To. Strictly, also the pin-hole position would shift to the right in the time axis relative to the curve S0 since it takes a longer time from the start of shutter blades actuation to the pin-hole forming compared to the normal shutter, though the pin-hole position or the reference position for the open time To is set at a zero point of the timing charts for convenience sake.

Since the exposure amount corresponds to the area bounded by the curve S0 or Sx and the time axis, the exposure amount associated with the curve Sx is remarkably smaller than that associated with the curve S0. Also there is a large difference in peak aperture size or diameter D0 or D1 between the curves S0 and Sx. Therefore, the unexpectedly decelerated shutter blades will cause an under-exposure. Similarly, an unexpectedly accelerated shutter blades will cause an over-exposure.

Furthermore, in case the shutter close signal serves as the flash trigger signal, since the shutter close signal is generated immediately before the aperture size reaches the peak value, the amount of flash light effecting on the exposure largely depends on the peak diameter. Therefore, the deviation from the expected peak diameter D0 has certain effect on the exposure in flash-photography.

Figure 13:
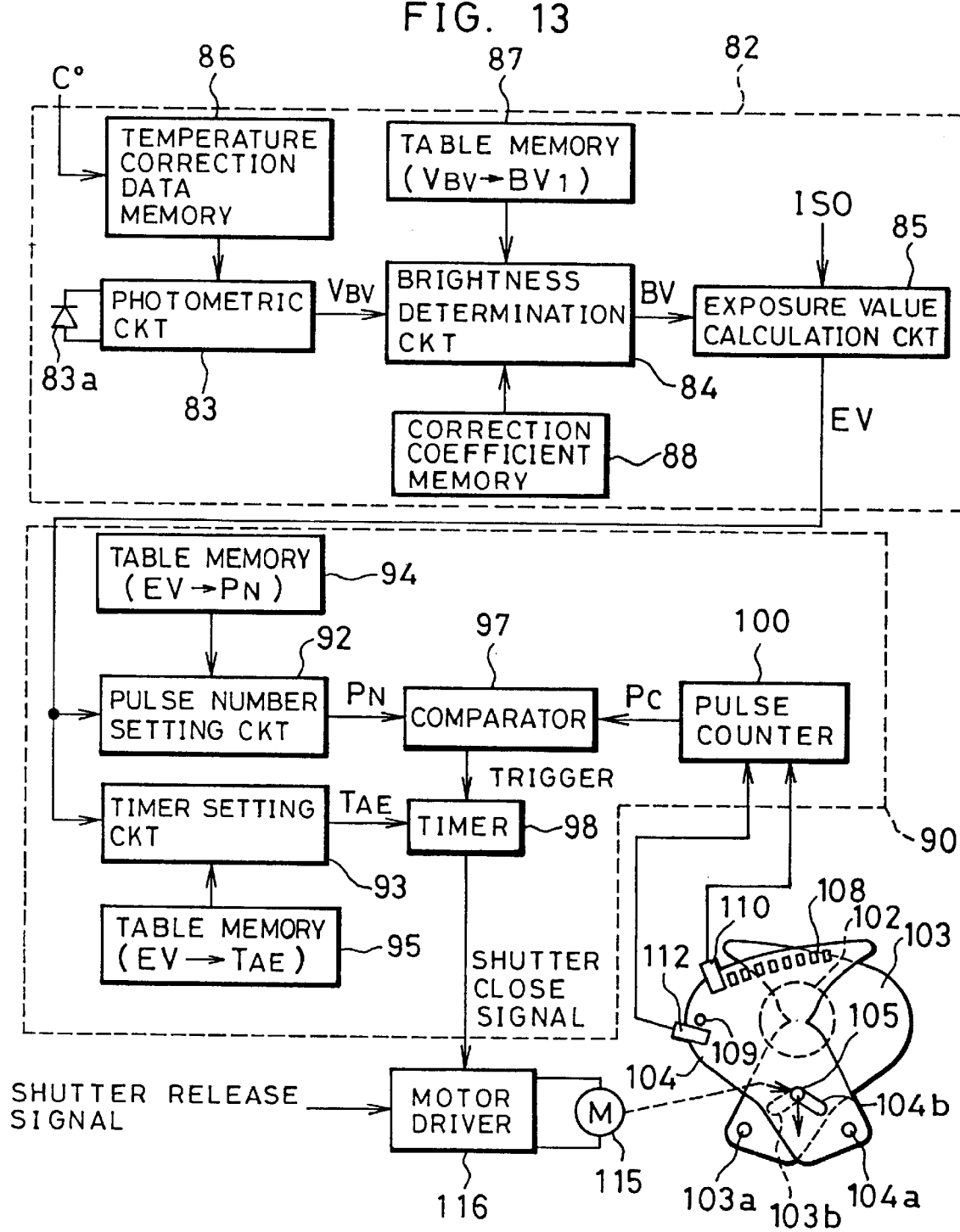
FIG. 13 is a functional block diagram of an exposure control device according to a third preferred embodiment of the present invention, wherein exposure time is controlled to achieve a proper exposure amount in spite of a variation in shutter blade moving speed.

FIG. 13 shows an embodiment which permits precise exposure control at low costs in spite of shutter blades moving speed changes. According to this embodiment, an exposure control device is constituted of an exposure value calculating section 82 and an exposure control section 90 which are controlled by a microcomputer according to a photographic sequence program. The exposure calculating section 82 is basically constituted of a photometric circuit 83 including a photo-electric element 83a, a brightness determination circuit 84, and an exposure value calculation circuit 85. The photometric circuit 83 outputs a light measurement signal $V_{BV}$ corresponding to a light amount received on the photo-electric element 83a. Because the value obtained from the photo-electric element 83a may be affected by peripheral temperature C°, the light measurement signal $V_{BV}$ is detected taking the peripheral temperature C.° into consideration. For this purpose, a temperature correction data memory 86 is connected to the photometric circuit 83.

The brightness determination circuit 84 converts the light measurement signal $V_{BV}$ into a digital value, and determines a brightness value BV1 based on the digital value with reference to a table memory 87. The table memory 87 is constructed as ROM, and stores a conversion table for converting the digital values into standard brightness values BV1. So far as ordinary front-lighted scenes concerned, the standard brightness values BV1 may be useful for calculating an proper exposure value. However, in flash-photography and back-light photography, it is necessary to correct the exposure value correspondingly. In addition, it is preferable to take account of the difference between individual cameras into exposure calculation. For this purpose, the brightness determination circuit 84 corrects the standard brightness value BV1 with various correction coefficients stored in a correction coefficient memory 88 to output a corrected brightness value BV to the exposure calculation circuit 85. The exposure correction circuit 85 reads film speed data from a loaded film, and calculates an exposure value EV based on the brightness value BV and the film speed. The exposure value EV thus calculated is outputted in digital form to the exposure control section 90.

In the exposure control section 90, a pulse number setting circuit 92 reads a pulse number $P_N$ corresponding to the exposure value EV from a table memory 94 constructed by ROM, while a timer setting circuit 93 refers to another table memory 95 to determine a time period $T_{AE}$ in association with the exposure value EV.

The table memory 94 stores a conversion table as shown schematically in FIG. 14, wherein all exposure values EV to be calculated in the exposure value calculating section 82 and included in a range allowable for automatic exposure control, are allocated in each decrement of 0.1 (Ev) to a pulse number $P_N$. The pulse number $P_N$ does not increase with every decrement of the exposure value EV, but in total, the number $P_N$ becomes the larger, the smaller the exposure value EV becomes. In case the calculated exposure value EV is "13.9", for instance, the pulse number setting circuit 92 determines "5" as the pulse number $P_N$.

The table memory 95 may also be a ROM which stores a EV-$T_{AE}$-conversion table as shown schematically in FIG. 15, wherein all exposure values EV to be calculated are allocated in each decrement of 0.1 (Ev) to a time period $T_{AE}$. The time periods $T_{AE}$ are expressed in 1/1000 second (ms). For the exposure value EV "13.9", the timer setting circuit 93 determines "4.0 ms" as the time period $T_{AE}$. Comparing the EV-$T_{AE}$-conversion table with the EV-$P_N$-conversion table shown in FIG. 14, the time period $T_{AE}$ gradually increases in those ranges of the exposure value EV wherein the pulse number $P_N$ is unchanged with the exposure value EV. On the other hand, the time period $T_{AE}$ decreases by a certain degree at every increment of the pulse number $P_N$. Although the table memories 94 and 95 are provided separately from each other, the conversion tables shown in FIGS. 14 and 15 may be combined into a table.

The pulse number $P_N$ and the time period $T_{AE}$ thus determined are inputted to a comparator 97 and a timer 98, respectively. The comparator 97 compares a count Pc of a pulse counter 100 with the pulse number $P_N$ to output a clock trigger signal to the timer 98 when the count Pc reaches the pulse number $P_N$. The timer 98 starts clocking in response to the clock trigger signal, to output a shutter close signal when clocks up to the time period $T_{AE}$. In this embodiment, the timer 98 counts clock pulses sent from the microcomputer, and outputs the shutter close signal upon counting up to a clock pulse number which corresponds to the time period $T_{AE}$.

To open and close an exposure opening 102 of a camera, a pair of shutter blades 103 and 104 are provided, each of which can swing about an axis 103a or 104a and has a cam slot 103b or 104b. A drive pin 105 is inserted through the cam slots 103b and 104b such that, when the drive pin 105 moves in a direction as shown by an arrow in FIG. 13, the shutter blades 103 and 104 are swung in respective opening directions opposite to each other, to open the exposure opening 102. While the drive pin 105 moves back to an initial position shown in FIG. 13, the exposure opening 102 is being closed. The rotational angle of the shutter blades 103 and 104 defines the aperture size.

One of the two shutter blades 104 has a plurality of slits 108 formed through its distal end portion. The slits 108 are arranged at constant intervals along an arc formed around the rotational axis 104a in an angular range corresponding to the swing angle of the shutter blade 104. Any of the slits 108 will not overlap the exposure opening 102 even while the shutter blade 104 swings. The shutter blade 104 further has a signal hole 109 formed therethrough. The slits 108 are detected by a sensor, e.g., a photo-interrupter 110, to serve as a signal member for indicating angular position of the shutter blade 104. The signal hole 109 is detected by a sensor, e.g., a photo-interrupter 112 for determining the pin-hole position of these shutter blades 103 and 104. The slits 108 and the signal hole 109 may be integrally formed with the shutter blade 104, e.g., by blanking. The integrally formed slits 108 may be replaced by an attachment of a sheet having a line of transparent windows arranged at constant intervals which are formed for example by photomechanical process.

The photo-interrupters 110 and 112 are each constituted of a light projector and a light receptor which are disposed on opposite sides of the shutter blade 104. The photo-interrupter 30 is disposed in the course of the slits 108 so as to output a high level signal when the light path thereof is blocked by the shutter blade 104, and output a low level signal when the slit 108 is in the light path. Therefore, the photo-interrupter 110 outputs encode pulses having alternately high and low levels while the shutter blade 104 moves. The photo-interrupter 112 is disposed in the course of the signal hole 109, so as to detect the signal hole 109 the moment when a pin-hole is formed between the shutter blades 103 and 104.

The encode pulses from the photo-interrupter 110 is sent to the pulse counter 100, which counts the number of falling edges of the encode pulses, hereinafter referred to simply as encode pulses. Since the position of the slits 108 in the shutter blade 104 and the spacings therebetween are known, the count Pc of the pulse counter 100 represents the present angular position of the shutter blade 104 and hence the present aperture size formed between the shutter blades 103 and 104. It is possible to count the number of raising edges of the encode pulses in stead of falling edges thereof. It is also possible to count the number of both raising and falling edges of the encode pulses in order to improve the resolution or fineness of shutter blade position detection.

The pin-hole position signal from the photo-interrupter 112 is also sent to the pulse counter 100 to serve as a count start signal upon which the pulse counter 100 starts counting the encode pulses. Instead of forming the slits 108 and the signal hole 109 through the shutter blade 104, a pattern may be printed on the shutter blade 104 with a high reflective material. In this alternative, reflective photo-sensors should be substituted for the photo-interrupters 110 and 112 to detect the encode pulses and the pin-hole position signal. Such a pattern may be formed by a magnetic material while using magnetic sensors therefor. In any case, it is preferable for accuracy of exposure control to detect the position of the shutter blade 104 without the need for contacting it.

The drive pin 105 is driven by a motor 115 which is controlled by a motor driver 116. When a shutter release signal is inputted in the motor driver 116, the motor 115 is caused to rotate forward to open the shutter blades 103 and 104 through the drive pin 25. When the shutter close signal is supplied from the timer 98, the motor 115 is caused to rotate reversely to close the shutter blades 103 and 104. As an actuator for the shutter blades 103 and 104, a galvanometer or the like whose rotational angle is less than 360° may be applicable.

Figure 16:
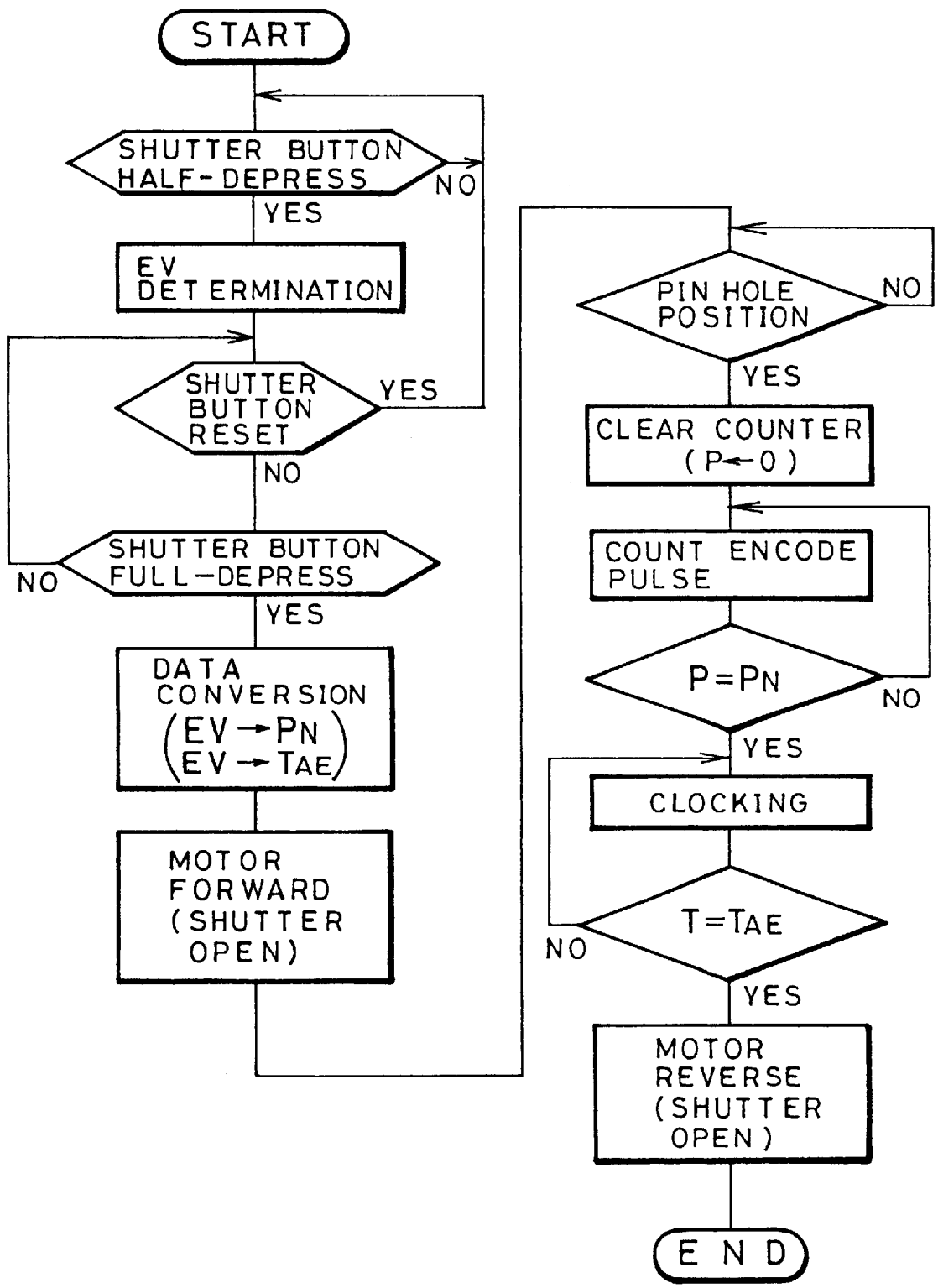
FIG. 16 is a flow chart illustrating the operation of the exposure control device of the third embodiment shown in FIG. 13.

FIG. 16 shows a flow chart of the operation of the embodiment shown in FIG. 13. Upon half depression of a shutter button of the camera, a proper exposure value EV is calculated in the exposure calculating section 82. If the shutter button is reset to an initial position, the calculated exposure value EV is canceled, and a new exposure value EV is calculated again upon the next half-depression of the shutter button. First when the shutter button is fully depressed, the calculated exposure value EV gets effective to the exposure control, and is sent to the pulse number setting circuit 92 and the timer setting circuit 93. These setting circuits 92 and 93 convert the exposure value EV into a corresponding pulse number $P_N$ and a corresponding time period $T_{AE}$ with reference to the table memories 94 and 95, respectively.

In response to the full-depression of the shutter button, the motor driver 116 is supplied with a shutter release signal to drive the motor 115 to rotate forward. As a result, the shutter blades 103 and 104 begin to move from the initial completely closed position toward an open position. While the shutter blades 103 and 104 are in motion, the photo-interrupter 102 detects the signal hole 109 to input a count start signal to the pulse counter 100. Then, the count Pc of the pulse counter 100 is reset to zero to start counting the encode pulses from now on.

Figure 17:
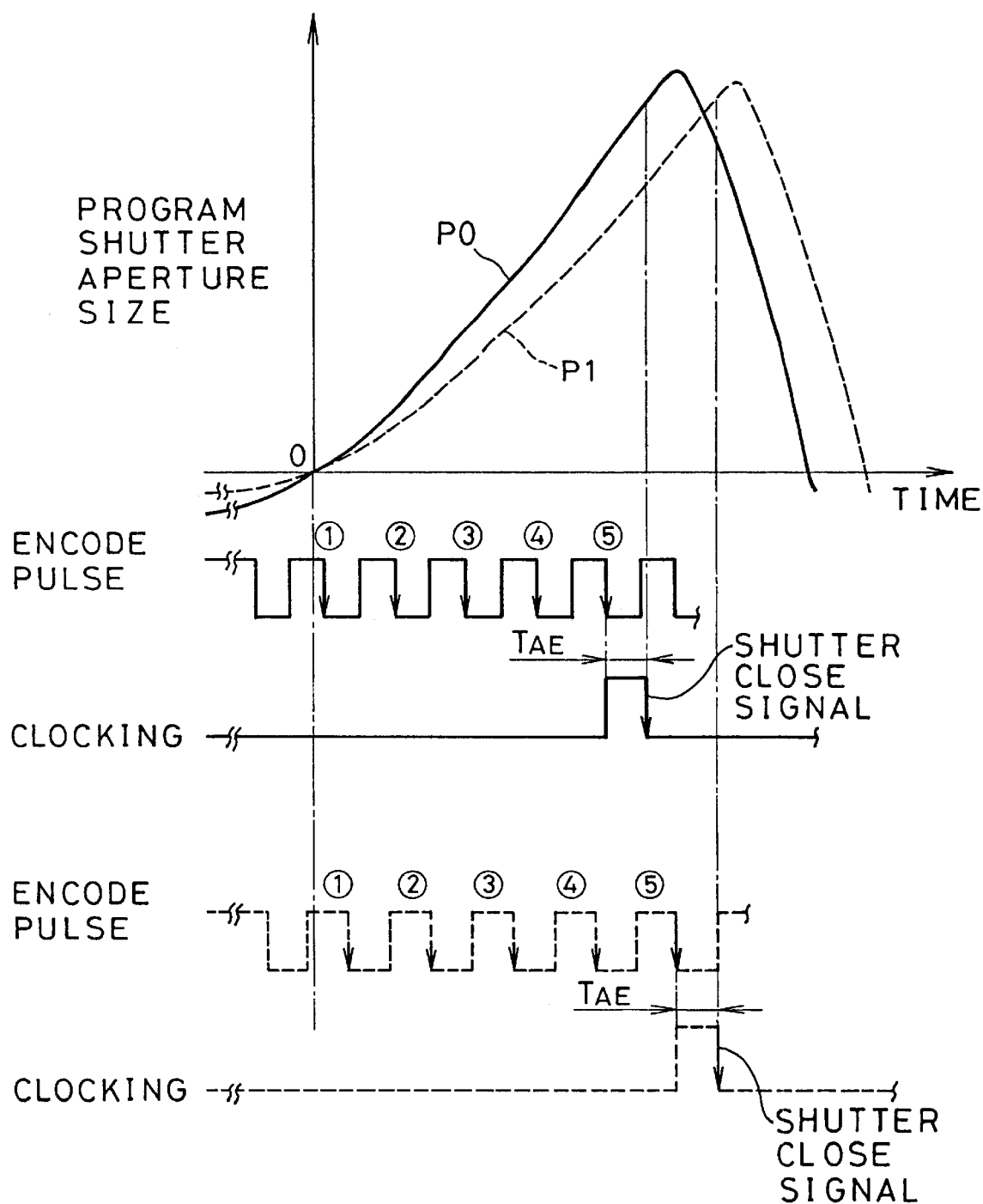
FIG. 17 shows timing charts illustrating exposure time control according to the third embodiment.

FIG. 17 illustrates the change of aperture size formed between the shutter blades 103 and 104 when the calculated exposure value EV is "13.9", in connection with the encode pulses and the operation of the timer 98. A curve P0 and timing charts shown by slid lines relate to a case where the shutter blades 103 and 104 move at a standard speed. The zero point of the graph corresponds to the pin-hole position at which the pulse counter 100 starts counting.

After the pin-hole is formed, the shutter blades 103 and 104 continue to move to gradually increase the aperture size, and the slits 108 seriatim pass the photo-interrupter 110. Then, the pulse counter 100 counts up one by each falling edge of the encode pulses generated from the photo-interrupter 110. Since the exposure value EV is "13.9" in this instance, a pulse number $P_N=5$ and a time period $T_{AE}=4.0$ ms are set in the pulse number setting circuit 92 and the timer setting circuit 93, respectively.

The comparator 97 compares the pulse number $P_N=5$ with the count Pc of the pulse counter 100 to outputs a clock trigger signal to the timer 93, whereupon the timer starts clocking. The moment when a clocked time reaches the time period $T_{AE}=4.0$ ms, a shutter close signal is inputted to the motor driver 116 to cause the motor 115 to rotate reversely. As a result, the shutter blades 103 and 104 begin to move back to the initial closed position with a certain mechanical delay from the shutter close signal. Determination as to whether the shutter blades 103 and 104 return to the initial position or not can be made in the same way as the determination of the pin-hole position.

Although encode pulses are generated also while the shutter blades 103 and 104 are being closed, these encode pulses are not shown in the drawings because being unnecessary for the exposure control. However, because the number of encode pulses counted by the pulse counter 100 during the closing of the shutter blades 103 and 104 is equal to the number of encode pulses counted during the opening of the shutter blades 103 and 104, it is possible to count down the encode pulses upon the shutter close signal so as to determine that the shutter blades 103 and 104 return to the pin-hole position when the count has decreased to zero.

In case the calculated exposure value EV is "14.0", the same pulse number $P_N=5$ is selected as in the case of EV=13.9. Therefore, a clock trigger signal is outputted upon the fifth falling edge of the encode pulses, as shown in FIG. 17. However, a different time period "3.2 ms" is allocated as $T_{AE}$ to the exposure value EV=14.0, the timer 98 outputs a shutter close signal at a timing 0.8 ms faster than the case of EV=13.9. Therefore, a shorter exposure time is properly provided for EV=14.0 than that for EV=13.9.

On the other hand, when the calculated exposure value EV is "13.8", a clock trigger signal is outputted when the count Pc of the pulse counter 100 reaches "6", that is, at a later timing compared with the case of EV=13.9. If the time period $T_{AE}$ was 4.0 ms for EV=13.8 while the pulse number $P_N$ is "6", it would result in an over-exposure. However, the time period $T_{AE}$ is predetermined to be 1.0 ms for EV=13.8, so that a proper exposure amount is obtained.

A curve P1 and timing charts shown by dashed lines in FIG. 17 relate to a case where the moving speed of the shutter blades 103 and 104 is lowered for some reason such as increased friction, and the calculated exposure value EV is "13.9". For convenience sake, the pin-hole position of the curve P1 is set at the zero point of the graph like as the curve P0. As seen from these timing charts, with the lowered moving speed of the shutter blades 103 and 104, pulse spacings of encode pulses generated at that time are elongated correspondingly. Therefore, the timing of clock trigger signal to be outputted from the comparator 107 is set later compared with the standard case even with the same pulse number $P_N=5$.

Since the timer 98 starts clocking the time period $T_{AE}=4.0$ ms upon the clock trigger signal delayed in this way, also the timing of shutter close signal to be outputted from the timer 98 is set later by the delay time of the clock trigger signal, so that a longer exposure time is provided to compensate for the deceleration of the shutter blades 103 and 104. Accordingly, an exposure amount obtained by the curve P1 is substantially equal to that obtained by the curve P0. Also the aperture size peak of the curve P1 little differs from that of the curve P0. Therefore, a satisfactory exposure will be made even in a flash photography wherein the shutter close signal serves as a flash trigger signal.

In the same way as above, if the shutter blades 103 and 104 should move at a higher speed than the standard value, a correspondingly shortened exposure time will compensate for it.

Figure 18:
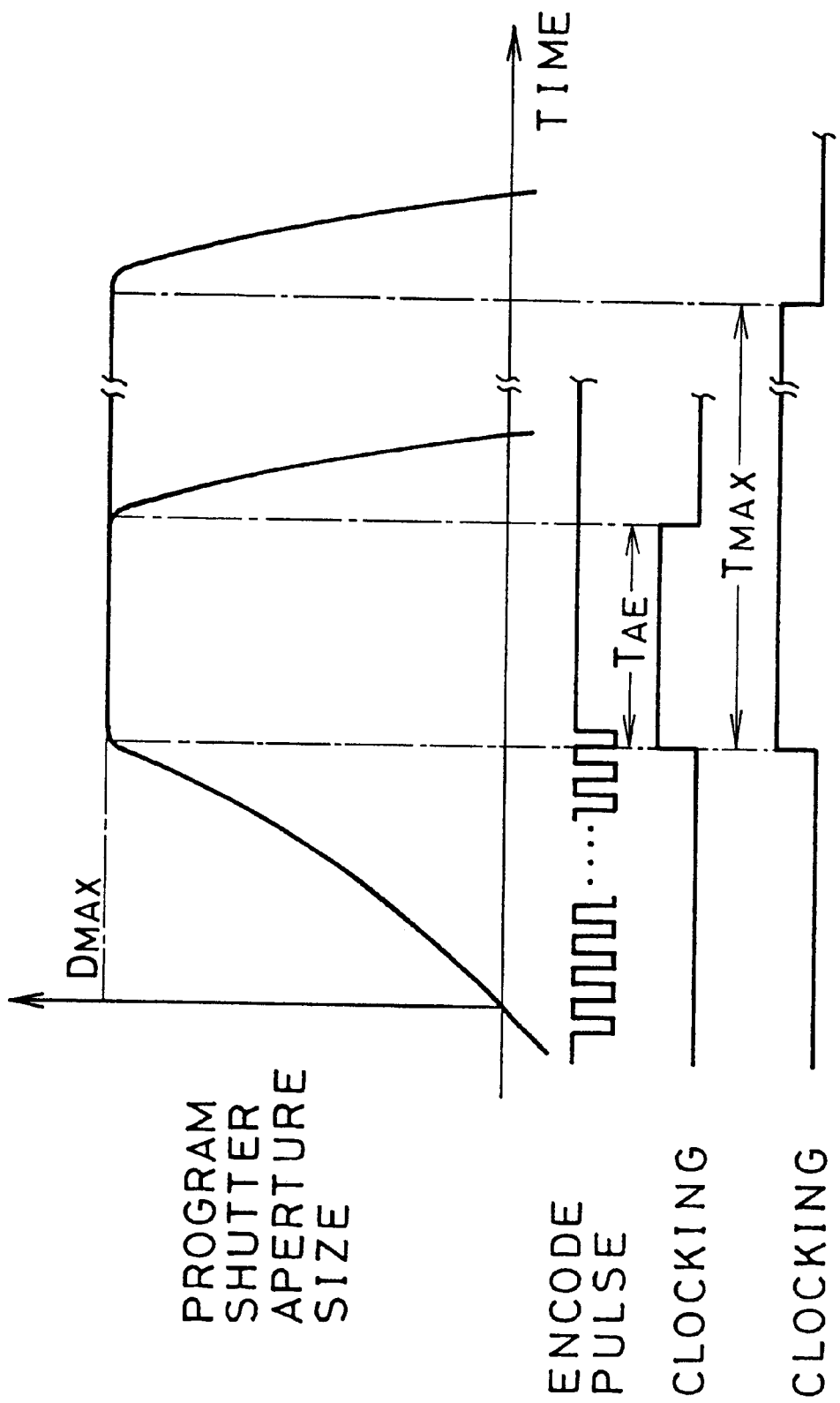
FIG. 18 shows timing charts illustrating exposure time control for long time exposure according to the third embodiment.

FIG. 18 illustrates an aperture size change relating to a long time exposure, in connection with the encode pulses and the operation of the timer 98. In the long time exposure, the shutter blades 103 and 104 are moved to open up the exposure opening 102 to the full, and stopped by a stopper member to be kept in the full open position. Therefore, the aperture size is fixed to a maximum value $D_{MAx}$ which is defined by an inner diameter of the exposure opening 102. While the shutter blades 103 and 104 stop at the full open position, no encode pulse is generated, so that the exposure amount for the long time exposure is controlled by changing the time period $T_{AE}$.

For example, if twenty slits 108 are formed through the shutter blade 104 and the photo-interrupter 110 is adapted to output sixteen encode pulses in a range from the pin-hole position to the full open position, the largest pulse number $P_N$ stored in the table memory 94 is "16", so that the pulse number $P_N$ to be set in the pulse number setting circuit 92 is limited up to "16".

On the other hand, in the EV-$T_{AE}$-conversion table of the table memory 95, time period $T_{AE}$ gradually increases with gradual decrease of exposure values EV in the range where the largest pulse number $P_N=16$ is allocated. Therefore, as for those exposure values EV for which the pulse number $P_N$ is "16", exposure amount is controlled by changing the time period $T_{AE}$ in accordance with the exposure values EV, after the pulse counter 100 counts up to sixteen, as is shown in FIG. 18, wherein $T_{MAX}$ represents a predetermined maximum value of the time period $T_{AE}$.

According to the embodiment shown in FIGS. 13 to 18, since a shutter blade has a signal member for position detection of the shutter blade, and a timer starts clocking from a shutter blade position, which is determined in accordance with a calculated proper exposure value, so as to generate a shutter close signal when the timer clocks up a time period determined also in accordance with the calculated exposure value, a correct exposure amount is achieved even if the speed of the shutter blade movement should change. Since the shutter blade positions for the respective exposure values are stored as pulse numbers in a table memory, and the position of the shutter blade is determined by comparing a corresponding pulse number with the number of pulses obtained from the signal member during the movement of the shutter blade, a high speed calculation is achieved by a simple construction.

The number of slits 108 of the shutter blade 104 may be appropriately determined in consideration of the available range of exposure values EV as well as the expected accuracy or fineness of exposure control. Also the spacing between the slits 108 can be changed from one another in accordance with increments of exposure values EV. The timing to start counting the encode pulses need not exactly be set at the pin-hole position.

It is possible to previously store the number Px of encode pulses to be obtained in a time from the start of movement of the shutter blade 104 to the pin-hole position, so as to start counting upon the shutter release signal and reset the pulse counter 100 to zero once the count reaches the number Px.

By counting anew the encode pulses generated thereafter, the same effect as above is available without the signal hole 102 and the photo-interrupter 112. It is also possible to set the pulse numbers $P_N$ taking account of the pulse number Px in the EV-$P_N$-conversion table. According to this embodiment, the shutter release signal may be used as a clock trigger signal for the pulse counter 100, without the need for resetting the pulse counter 100 once at the pin-hole position.

As described so far, the embodiment shown in FIGS. 13 to 18 is on the premise that the speed of the shutter blades 103 and 104 will not remarkably change or fluctuate during one stroke. This embodiment is sufficient enough to correct most variations of shutter blade moving speed wherein the speed totally gets lower or higher than a standard value, that is, the curve of aperture size relating to time gets gentler or steeper than a standard curve, as shown for instance by dashed lines in FIG. 17.

Figure 19:
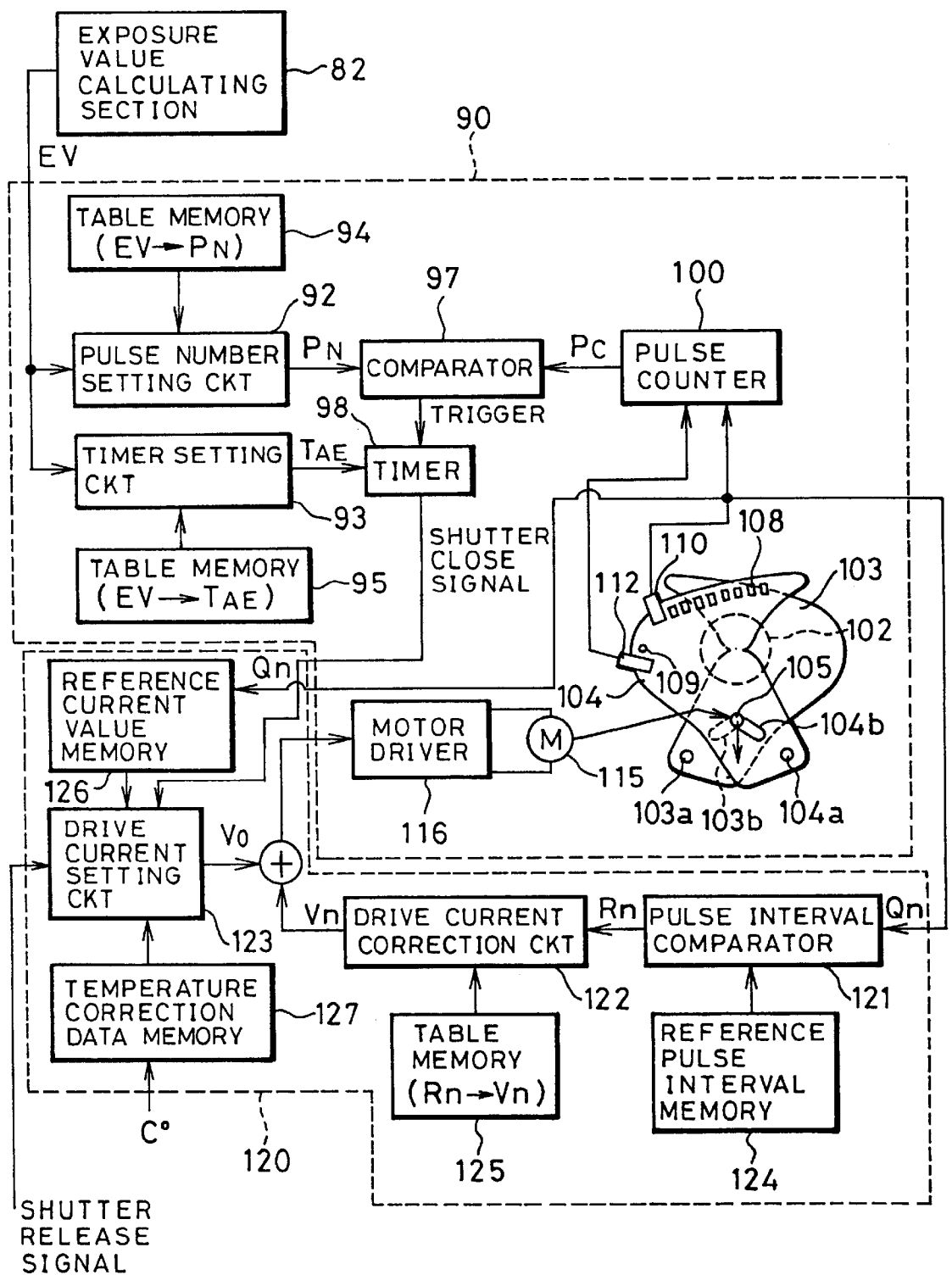
FIG. 19 is a functional block diagram of an exposure control device according to a fourth embodiment of the present invention, wherein drive current for shutter blades is adjusted to variations in shutter blade moving speed.

In practice, however, the shutter blade moving speed may fluctuate during one stroke of the shutter blades. Since photography on reversal films and instant films requires much more accuracy in exposure control compared with photography on negative films, it is desirable to make up for speed fluctuation during a stroke of the shutter blades. In view of the foregoing, an embodiment shown in FIG. 19 is provided with a current control section 120 in addition to an exposure calculating section 82 and an exposure control section 90 which have the substantially same constructions as those shown in FIG. 13. The current control section 120 monitors the moving speed of a shutter blades 104 so as to change a drive current for a motor 115 in response to a change in moving speed of the shutter blade 104.

Figure 20:
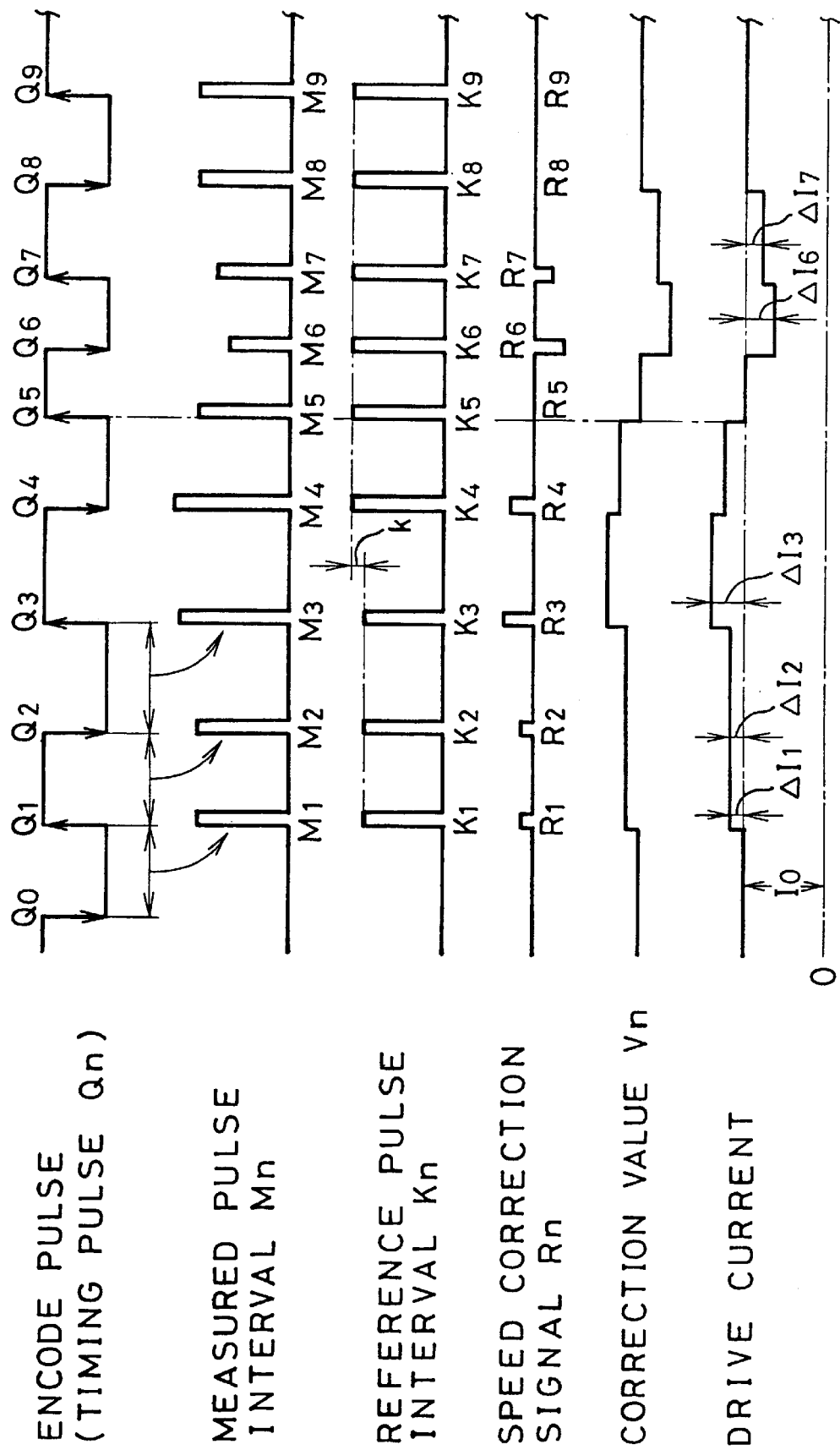
FIG. 20 shows timing charts illustrating drive current control according to the fourth embodiment, executed in an earlier stage of shutter opening movement.

The current control section 120 includes a pulse interval comparator 121, a drive current correction circuit 122, and a drive current setting circuit 123. FIG. 20 shows timing charts illustrating the operation of the pulse interval comparator 121. Each time the signal level of the encode pulse inverts, the comparator 121 starts counting clock pulses till the next signal level inversion to measure a time interval between two adjacent edges Q(n−1) and Qn (n=an integer) of the encode pulse signal as a pulse interval Mn. Therefore, each edge Qn of the encode pulse signal may be referred to as a timing pulse Qn. The pulse interval Mn is outputted as a clock pulse number to the comparator 121. Then, the comparator 121 compares each measured pulse interval Mn with a corresponding reference pulse interval Kn which represents a pulse number and is sequentially read from a reference pulse interval memory 124 upon each timing pulse Qn, to output a difference "Mn−Kn" as a speed correction signal Rn.

The measured pulse interval Mn will have the smaller value, the higher is the moving speed of the shutter blade 104. The reference pulse interval Kn represents each individual time interval between two adjacent edges of those encode pulses which are to be obtained when the shutter blade 104 continuously moves at a standard speed. These reference pulse intervals Kn may be determined by measurement of the encode pulses while opening and closing the shutter blades 103 and 104 at the standard speed in factory, and stored in the reference pulse interval memory 124 during manufacturing the camera, so as to absorb the individualities of the camera. For this reason, the memory 124 is preferably an EEPROM.

Since the speed correction signal Rn=Mn−Kn, the signal Rn has a positive value when Mn>Kn, that is, when the actual moving speed of the shutter blade 104 is lower than the standard level. The positive speed correction signal Rn results in accelerating the shutter blades 103 and 104, as will be described in detail below. When Mn<Kn, as it means that the actual moving speed of the shutter blade 104 is higher than the standard level, the speed correction signal Rn has a negative value to decelerate the shutter blades 103 and 104. When Mn=Kn, the speed correction signal Rn takes a zero level.

It is to be noted that the reference pulse interval Kn need not always have an ideal constant value. As shown for example in FIG. 20, the first to third reference pulse interval K1, K2 and K3 in the order of sequential reading may have a value a predetermined amount k smaller than the ideal value, so as to enlarge the drive current in the start of actuation of the shutter blades 103 and 104 on purpose that the shutter blades may not stall even if an excessive load is applied in this stage. Although the enlarged driven current may cause the shutter blade to move faster than the standard speed, the deviated moving speed of the shutter blade will automatically be corrected based on the comparison with the following reference pulse intervals K4, K5 and so forth, in the same way as set forth above.

Figure 21:
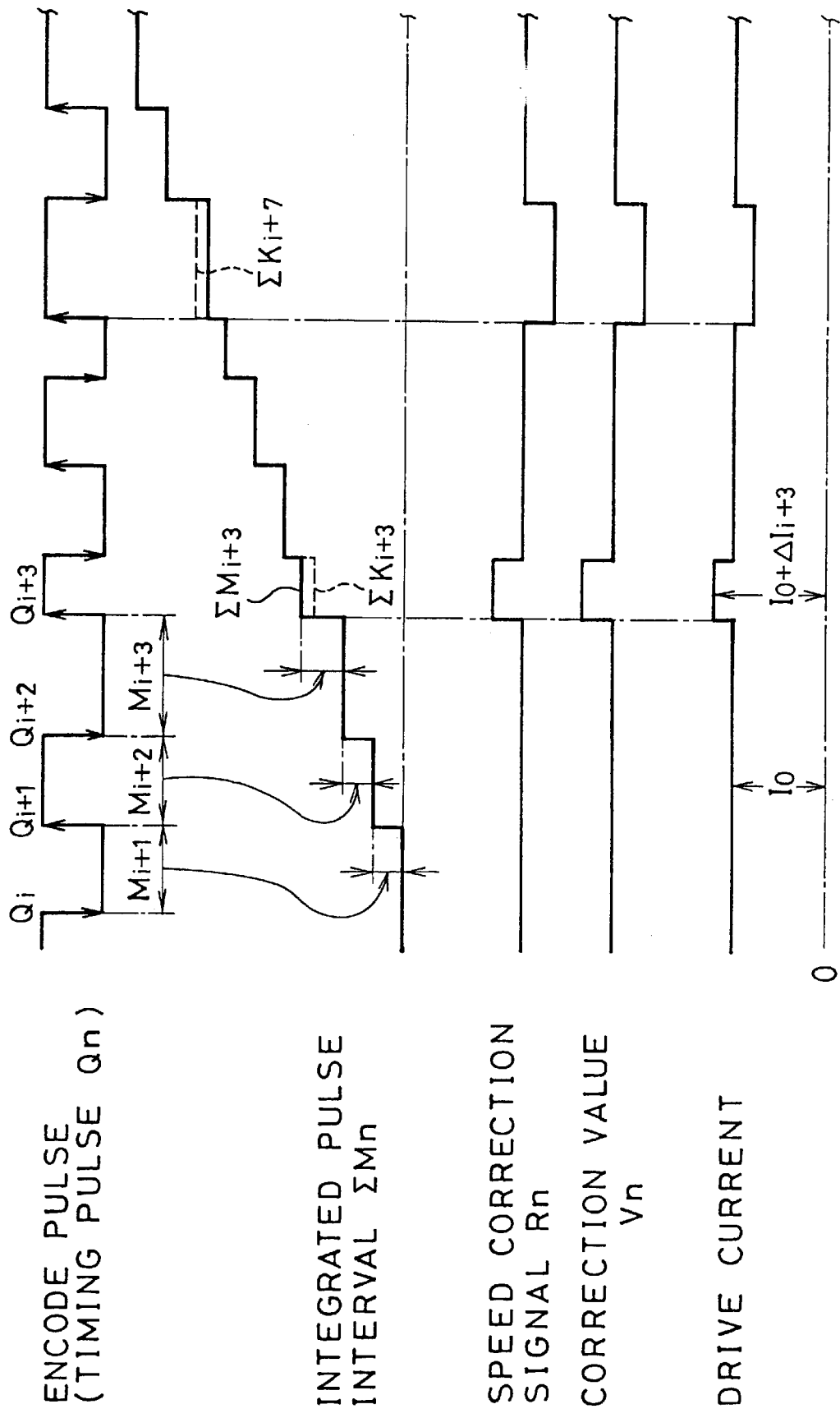
FIG. 21 shows timing charts illustrating drive current control according to the fourth embodiment, executed in a latter stage of the shutter opening movement.

After the shutter blade 104 reaches a predetermined intermediate position, e.g., the pin-hole position in the opening direction, the pulse interval comparator 121 starts integrating the measured pulse interval Mn. Specifically, as shown in FIG. 21, from a timing pulse Qi that is generated first after the pin-hole position in the opening direction, a pulse interval Mi measured from the timing pulse Qi to the next timing pulse Q(i+1) and the following measured pulse intervals M(i+1), M(i+2) and so forth are integrated to obtain an integral pulse interval ΣMn (n=i+1, i+2, i+3 . . . ) upon each timing pulse Qn.

On the other hand, the reference pulse interval memory 124 stores an integral reference pulse interval ΣKn (n=i+1, i+2, i+3 . . . ) in association with each timing pulse Qn of those which follow the predetermined timing pulse Qi, the integral reference pulse interval ΣKn being an integral value of those reference pulse intervals K(i+1) to Kn to be provided from the timing pulse Qi to the timing Qn. The pulse interval comparator 121 compares each integral pulse interval ΣMn with a corresponding integral reference pulse interval ΣKn to output a speed correction signal Rn based on a difference ΣMn−ΣKn. In FIG. 21, the integral pulse interval ΣMn is shown by a solid line, whereas the integral reference pulse interval ΣKn is shown by a dashed line, though the curve of the integral reference pulse interval ΣKn is not shown in those ranges where the integral pulse interval ΣMn is equal to the integral reference pulse interval ΣKn to compare with.

It is, of course, possible to compare each measured pulse interval Mn with the reference pulse interval Kn also after the pin-hole position as before the pin-hole position. However, because the speed of the shutter blades 103 and 104 is relatively stable and rarely fluctuates after the pin-hole position, comparison of the integral value of the measured pulse intervals with the integral reference pulse interval is enough to maintain the shutter blade speed constant, and much more preferable in terms of easy and rapid processing.

The speed correction signal Rn thus obtained by the pulse interval comparator 121 is inputted in the drive current correction circuit 122, which then refers to a table memory 125 for converting the speed correction signal Rn into a correction value Vn. The table memory 125 stores a conversion table in which a correction value Vn is assigned to each of all possible values of the speed correction signal Rn. Although it is possible to calculate the value Vn from the speed correction signal Rn using a mathematical function, storing a Rn-Vn-conversion table is preferable for a faster data processing.

The drive current setting circuit 123 is caused by a shutter release signal to start reading a reference current value from a reference current value memory 126 upon each timing pulse Qn. The reference current value is an optimum current value to be supplied to the motor 115 at the timing indicated by an associated timing pulse, that is, at a designated rotational angle of the shutter blade 104, to move the shutter blades 103 and 104 constantly at the standard speed. Accordingly, the reference current value for one timing pulse may be different from that for another timing pulse, so as especially to absorb speed variation caused by individualities of the shutter blades 103 and 104.

However, for convenience sake, the following description relates to a case where a constant reference current value Io is used regardless of the rotational angle of the shutter blade 104. Therefore, the drive current setting circuit 123 outputs a constant reference drive voltage signal Vo for every timing pulse Qn in this embodiment. A temperature correction data memory 127 is provided to adjust the drive voltage signal Vo to a peripheral temperature C°, considering a variation in rotational speed of the motor 115 which may be caused by a variation in peripheral temperature C°.

The correction value Vn obtained in the drive current correction circuit is added to the reference drive voltage signal Vo in an adder 128 so that a value "Vo+Vn" is applied as a drive voltage to the motor driver 116. The motor driver 116 supplies a corrected drive current "Io+ΔIn" to the motor 115, wherein a current correction value ΔIn may be a positive or negative value in correspondence with the polarity of the correction value Vn.

Now the operation of the current control section 120 will be described with reference to FIG. 22. A curve P0 shown by a dashed line represents an ideal change of aperture size of the program shutter when the shutter blades 103 and 104 moves constantly at the standard speed, whereas a curve P2 shown by a solid line represents an actual aperture size change, though the dashed line is not shown in those ranges where the curve P0 overlaps with the curve P2, that is, when the actual speed is equal to the standard speed. Also in FIG. 22, the zero point of the graph corresponds to a pin-hole position, and tA indicates a start point of shutter blade movement from the initial position.

In response to a shutter release signal, the drive current setting circuit 123 reads the reference drive voltage signal Vo from the reference current value memory 126, and outputs the signal Vo to the motor driver 116 to drive the motor 115 with the reference current value Io in a forward direction. Then, the shutter blades start moving in the opening direction. So long as the shutter blade 104 moves at the standard speed, the measured pulse interval Mn is equal to the reference pulse interval Kn stored in the reference pulse interval memory 124, so that the speed correction signal Rn and hence the correction value Vn from the drive current correction circuit 122 take the zero level, except in the start of the shutter blade movement.

That is, since the first to third reference pulse intervals K1, K2 and K3 for the timing pulses Q1, Q2 and Q3 are set smaller than the other reference pulse intervals, the first to third speed correction signals R1, R2 and R3 have a certain positive value even if the actual speed is equal to the standard speed in this stage. As a result, the motor 115 is supplied with an activation current that is larger than the standard current value Io correspondingly to the speed correction signals R1, R2 and R3, to accelerate the shutter blades 103 and 104 in the first stage of shutter blade actuation to reach the standard speed immediately after the start of movement.

Figure 22:
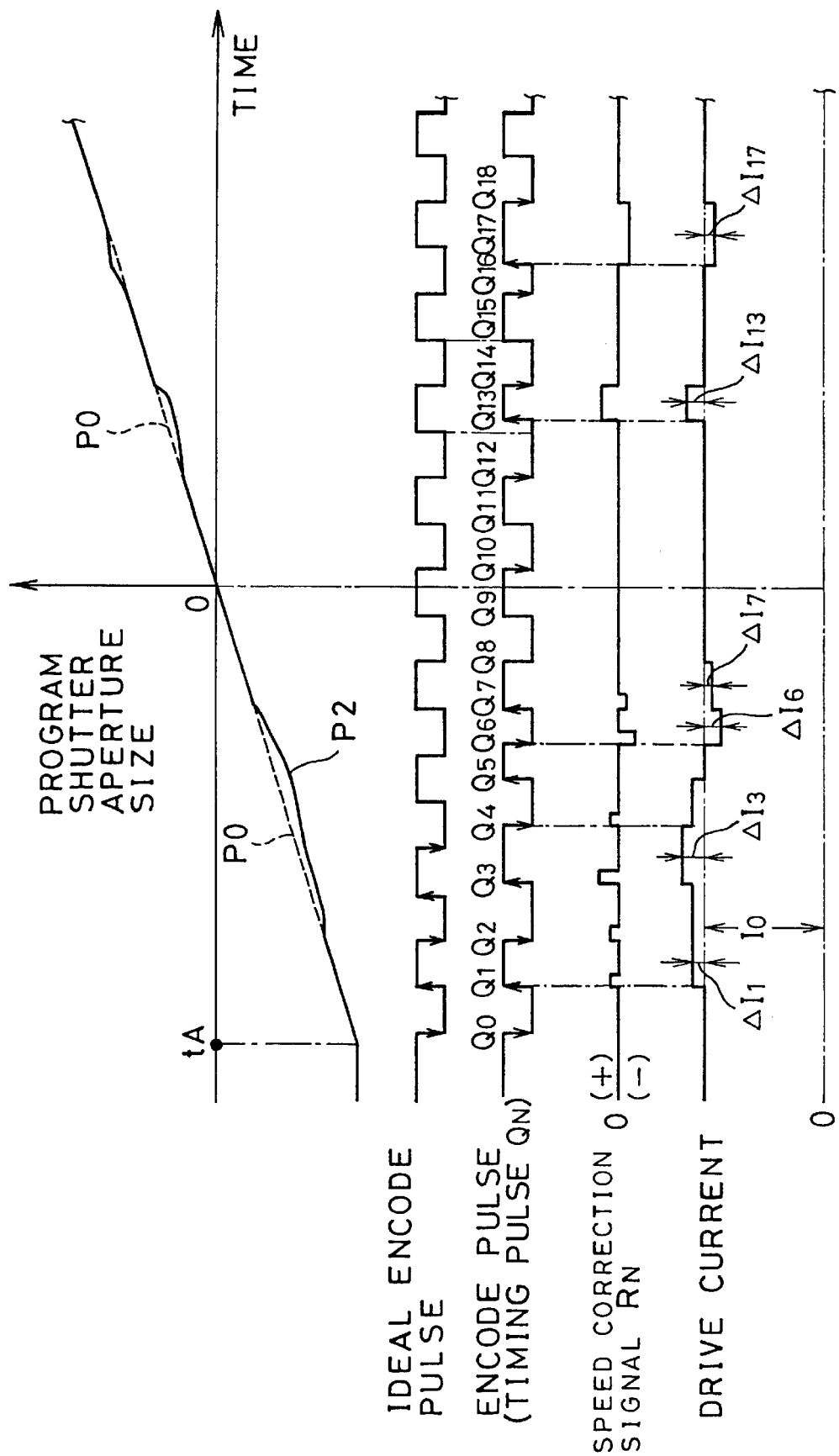
FIG. 22 shows timing charts illustrating a progress of aperture size in connection with the drive current.

If the moving speed of the shutter blades 103 and 104 becomes lower than the standard speed in a time period from the second timing pulse Q2 to the third timing pulse Q3, as shown in FIGS. 20 and 22, the third measured pulse interval M3 is larger than the third reference pulse interval K3. Then, the pulse interval comparator 121 outputs a positive value as the third speed correction signal R3. The positive speed correction signal R3 is converted into a positive correction value V3 which is added to the reference drive voltage signal Vo by the adder 128. As a result, the motor 115 is driven with an enlarged drive current "Io+^I3 to rotate at a higher speed. In the same way, because the measured pulse interval M4 is larger than the reference pulse interval K4 in the time period from the third to fourth timing pulses Q3 to Q4, a positive correction value V4 is added to the drive voltage signal Vo, so that the motor drive current has a larger value "Io+ΔI4 " than the standard value Io.

On the other hand, the measured pulse interval M6 from the fifth to sixth timing pulses Q5 to Q6 and the measured pulse interval M7 from the sixth to seventh timing pulses Q6 to Q7 are smaller than the sixth and the seventh reference pulse intervals K6 and K7, respectively. Since it means that the actual shutter blade moving speed is higher than the standard speed in the time interval from Q5 to Q7, the pulse interval comparator 121 outputs negative speed correction signals R6 and R7. Corresponding to these negative correction signal R6 and R7, the reference drive current value Io is reduced by current correction values ΔI6 and ΔI7 in the time interval from Q6 to Q8, to decelerate the motor 115. In this way, each time the timing pulse Qn is detected, the pulse interval Mn from the preceding timing pulse Q(n–1) is measured and compared with the corresponding reference pulse interval Kn to maintain the shutter blade moving speed constant, until the shutter blades 103 and 104 reach the pin-hole position.

After the shutter blade 104 reaches the pin-hole position in the opening direction, that is, from the tenth timing pulse Q10 in FIG. 22, the pulse interval comparator 121 starts integrating the measured pulse intervals M11, M12, M13 . . . upon each of the following timing pulses Q11, Q12, Q13 . . . to obtain an integral pulse interval ΣMn (ΣM11, ΣM12, ΣM13 . . . ) each. Each integral pulse interval ΣMn is compared with a corresponding integral reference pulse interval ΣKn (ΣK11, ΣK12, ΣK13 . . . ) stored in the reference pulse interval memory 124 , to output a speed correction signal Rn based on a difference ΣMn–ΣKn. The speed correction signal Rn is converted into a correction value Vn, which is added to the reference drive voltage signal Vo to correct the drive current correspondingly, in the same way as described above. In this way, the shutter blade is moved at approximately constant speed.

Simultaneously, when the shutter blades 103 and 104 pass the pin-hole position, a pulse counter 100 starts counting the pulse number of the encode pulses from the photo-interrupter 110. A comparator 97 compares the count Pc of the pulse counter 100 with a pulse number $P_N$ set by a pulse number setting circuit 92 to trigger a timer 98. The timer 98 outputs a shutter close signal when clocks up a time period $T_{AE}$ set in a timer setting circuit 93.

In response to the shutter close signal, the drive current setting circuit 123 reads a reference current value for shutter closing from the reference current value memory 126, to outputs a drive voltage signal for shutter closing which has an inverted polarity to the drive voltage signal Vo. As a result, the motor driver 116 rotates the motor 115 in reverse to move the shutter blades 103 and 104 in the closing direction back to the initial position, completing an exposure.

As described so far, the current control section 120 monitors the shutter blade speed and feeds back the actual speed to control the motor 115. Accordingly, the curve of the aperture size change is maintained stable to allow a high precision exposure control.

Because the encode pulse is generated during the returning movement of the shutter blades 103 and 104, it is possible to monitor the shutter blade speed in the closing direction to maintain it constant in the same way as in the opening direction. It is also possible to avoid measuring the pulse interval Mn in a time period directly after the start of actuation of the shutter blades 103 and 104, while supplying the motor 115 with an activation current which is larger than the reference drive current Io, so that the shutter blades 103 and 104 may quickly reach the standard speed and may not be stalled by an overload in the first stage of the actuation.

Although each edge of the encode pulses is detected as the timing pulse Qn in the above embodiment, it is possible to use either falling edges or raising edges of the encode pulses as timing pulses for monitoring the shutter blade moving speed.

The number of slits 108 of the shutter blade 104 may be appropriately determined in consideration of the expected accuracy or fineness of exposure control. Also the spacing between the slits 108 can be changed from one another. For example, it is possible to space the slits 108 at shorter intervals in a range where the shutter moving speed tends to be unstable.

The above-described current control method according to the invention is applicable also to a conventional program shutter control device wherein a time duration from a pin-hole position is clocked to output a shutter close signal when the time duration reaches a value determined in accordance with a calculated exposure value, as is shown for example in FIG. 26.

Figure 23:
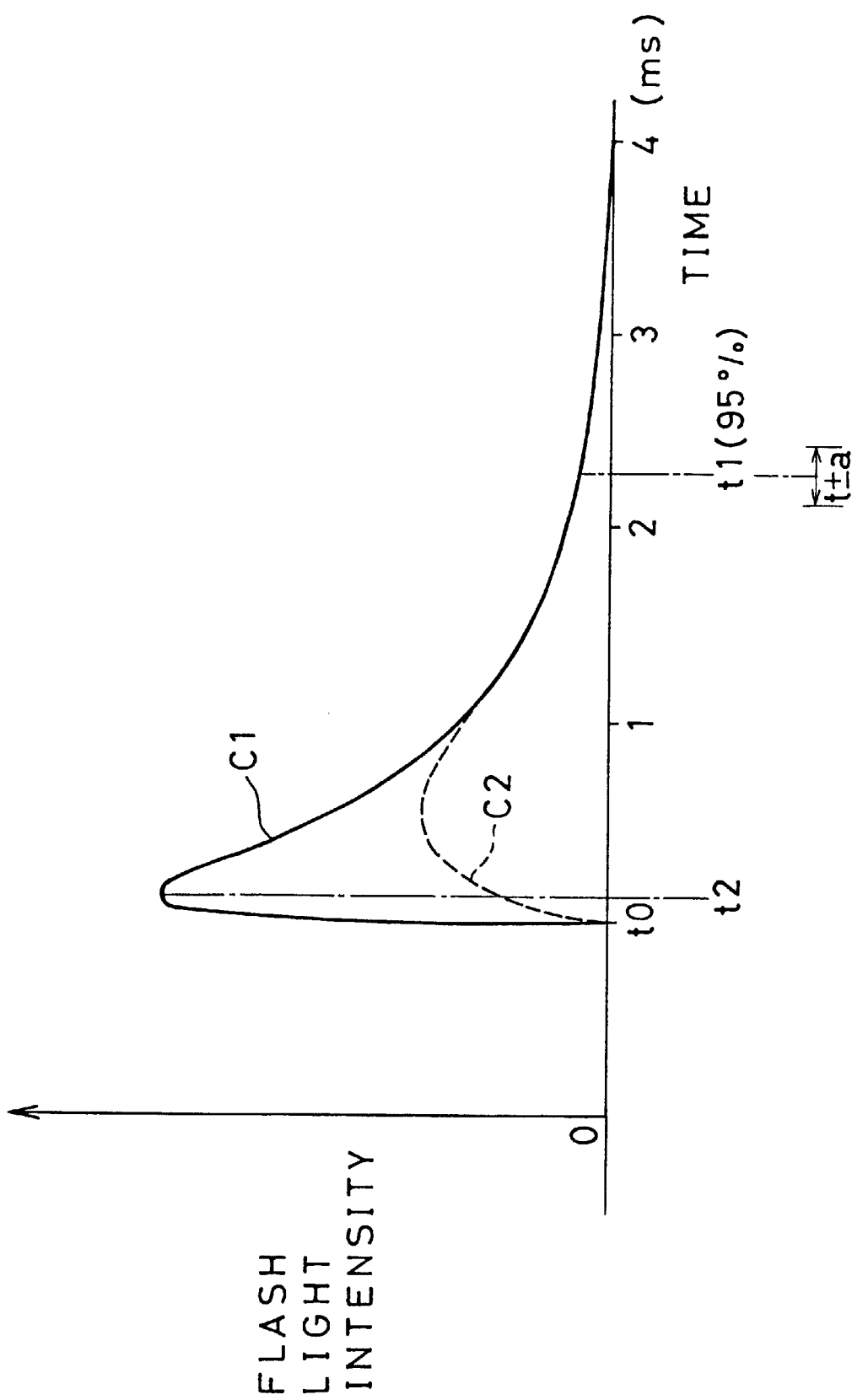
FIG. 23 is a graph illustrating flash light intensity characteristics relating to time.

FIG. 23 illustrates flash light intensity characteristics relating to time. As shown by a curve C1, the intensity of flash light ordinarily reaches its peak immediately after a flash fire time t0 when the flash light starts being projected. And then, the light intensity decreases gradually. According to a widely known automatic flash light control method, when an optimum flash light amount for an exposure value is determined to be 95% of the total available flash light amount, for instance, the flash firing is terminated at a time t1 before a full flash time. Since the time t1 is in the end portion of the light intensity decreasing period wherein the curve C1 is very gentle as shown in FIG. 23, even if the flash termination control has a timing error t±α, the change in the flash light amount caused by the timing error t±α would be so small that the effect on the exposure amount is negligible at that time.

However, in close-up flash photography, it is necessary to reduce the flash light amount to a large extent. Therefore, a flash termination time t2 for close-up photography must be set in a earlier stage where the flash light intensity curve C1 is steep. Therefore, the timing error t±α could results in an improper exposure amount.

To avoid the above-described problem, a diffusion plate has conventionally been attached to a front of a flash window in close-up flash photography, so as virtually to reduce the flash light intensity as shown by a curve C2 in FIG. 23. Since the curve C2 is gentler than the curve C1, flash light amount can be accurately controlled also for close-up photography by only setting a flash termination time. Because of the gentle curve C2, the diffusion plate efficiently restrains the effect of the timing error t±α on the actual exposure amount.

There have been known a close-up adopter or equipment which includes a close-up lens and the above-described diffusion plate as a compact unit. Indeed such a close-up equipment can be compact for use with a camera whose flash window is disposed near the taking lens. However, the conventional close-up equipment would not be compact for application to those cameras whose flash window is disposed away from the taking lens especially for preventing red-eye phenomenon. A separate diffusion plate attachment is possible but inconvenient in handling.

Figure 24:
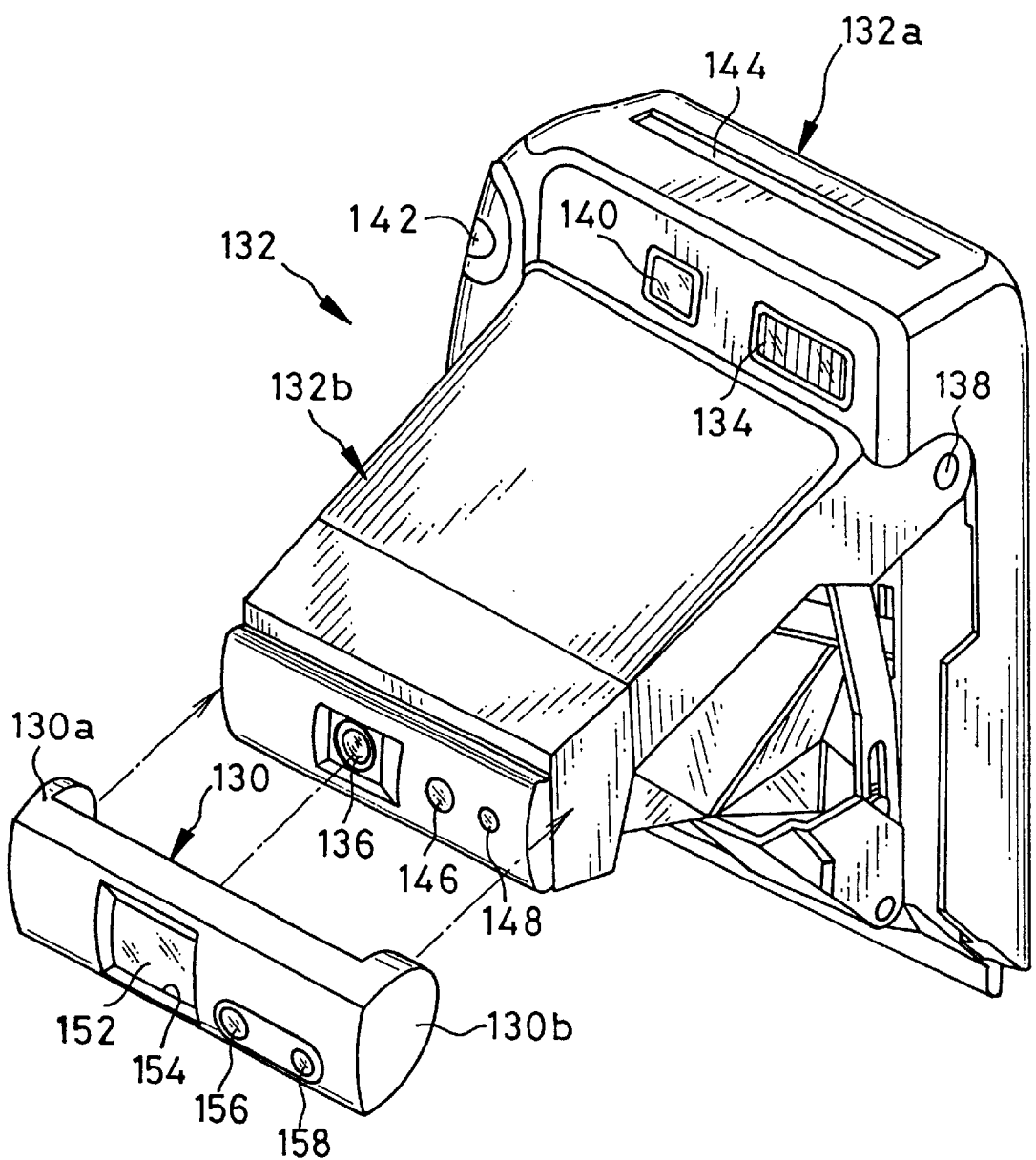
FIG. 24 is a perspective view of a close-up adaptor, which is attachable to an instant camera, according to another preferred embodiment of the invention.

FIG. 24 shows a close-up adaptor 130 according to a preferred embodiment of the invention, which is applicable to an instant camera 132 having a flash window 134 and a taking lens 136 which are distant from each other. The instant camera 132 has a main body 132a to which a lens board 132b is mounted movable about a hinge 138. The flash window 134, a finder objective window 140, a shutter button 142, and an ejection slot 144 are disposed in the main body 132a. The taking lens 136, an AE sensor 146 of an automatic exposure control system, and a flash light sensor 148 for automatic flash light control are disposed in the lens board 132b.

The close-up adaptor 130 has a substantially rectangular thin body. A close-up lens 152 is securely fitted in an opening 154 formed through a front middle portion of the adaptor 130. Prisms 156 and 158 are disposed on one side of the close-up lens 152, each serves as a condenser element. When the close-up adaptor 130 is attached to the front of the lens board 132b, the close-up lens 152 and the prisms 156 and 158 are disposed in front of the taking lens 136 and the sensors 146 and 148, respectively.

Figure 25:
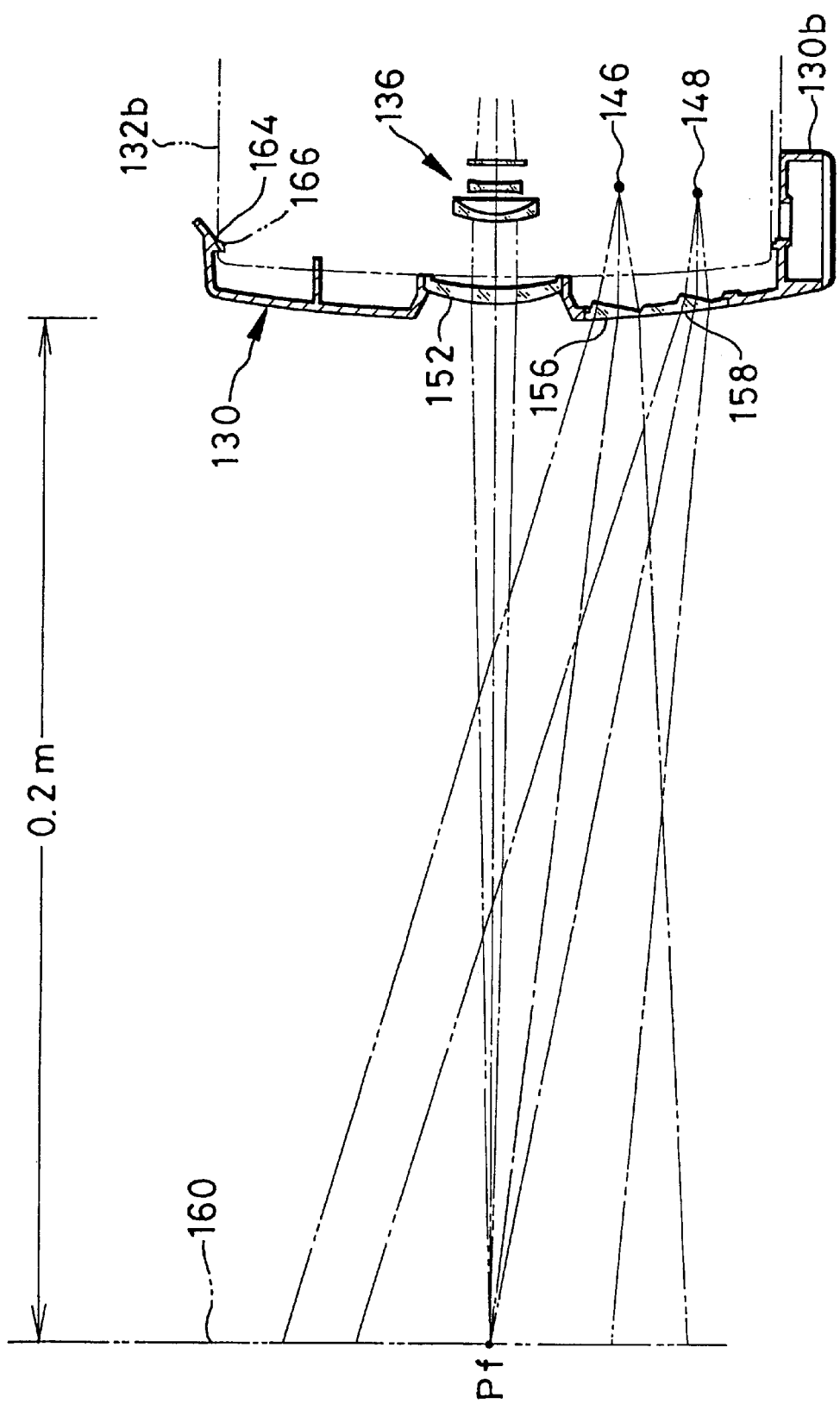
FIG. 25 is an explanatory view illustrating the operation of the close-up adaptor shown in FIG. 24.

According to the present embodiment, the close-up lens 152 mounted in the close-up adaptor 130 provides, in combination with the taking lens 136, an object focal plane 160 at 0.2 m from the camera 132, as is shown in FIG. 25. On the other hand, the prism 156 is arranged to converge light around the object focal point Pf to the AE sensor 146 so as to detect the brightness around a center area of a subject disposed in the object focal plane 160. The other prism 158 is designed to converge light projected from the flash window 134 and reflected from the subject to the flash light sensor 148.

The close-up lens 152 and the prisms 156 and 158 are made from transparent, light absorbing materials having an identical transmittance, that is, capable of reducing light intensity by the same degree. For example, the close-up lens 152 is made from polycarbonate, acrylic resin or the like, while the prisms 156 and 158 are made from ABS resin, polycarbonate, acrylic resin or the like.

The close-up adaptor 130 has semi-circular lugs 130a and 130b formed on opposite ends thereof to protrude rearward with respect to the camera 132. The lug 130a has a claw 164 on its inside surface. When the close-up adaptor 130 is force-fitted onto the front of the lens board 132b, the claw 164 is engaged in a notch 166 formed in one side wall of the lens bard 132b, to secure the close-up adaptor 130 to the camera 132.

Since the close-up lens 152 absorbs a fragment of light from the subject, the intensity of exposure light entering through the close-up lens 152 and the taking lens 136 in flash photography shows a gentle curve like as the curve C2 of FIG. 23, even though no diffusion plate is attached to the front of the flash window 134. Because the prism 158 has the same transmittance as the close-up lens 152, the intensity of reflection light detected by the flash light sensor 148 shows a corresponding curve to that of the exposure light. Accordingly, it is possible to automatically control flash light amount or flashing time while checking the amount of flash light effective to an actual exposure amount.

Also the AE sensor 146 receives light whose intensity is reduced by the prism 156, a measured subject brightness gets lower than an actual subject brightness. As a result, the AE system of the camera 132 calculates an excessive amount of flash light as necessary, compared with a flash light amount to be calculated based on the actual subject brightness. In case the necessary flash light amount for the actual subject brightness corresponds to the flash termination time t2 in relation to the curve C1 of FIG. 23, the calculated flash light amount would correspond to a flash termination time that belongs to the intensity decreasing period of the flash light, like as the flash termination time t1.

Consequently, the subject disposed at the close-up distance of 0.2 m is illuminated with the excessive flash light amount. However, because the intensity of light reflected from the subject is reduced by the close-up lens 152, and the close-up lens 152 and the prism 158 have the same absorbent, the absorption through the close-up lens 152 offsets or cancels the excess of flash light. In this way, the actual exposure amount results in a proper value. In addition, since the flash termination time is shifted into the light intensity decreasing period, as described above, a timing error t±α would not cause a remarkable change in the exposure amount.

Although the close-up lens 152 is formed separately from the prisms 156 and 158, it is possible to form these elements 152, 156 and 158 as an integral body from the same material, to reduce production costs. The close-up adaptor according to the invention is applicable to other types of cameras than instant cameras, as well as to those cameras whose flash device has no automatic flash light control system.

Although the present invention has been described in detail with respect to preferred embodiments, the present invention should not be limited to the embodiments. On the contrary, various changes and modifications may be used without departing from the scope of the invention as defined by the appended claims.

What is claimed is:

1. A photo-sensor for divided brightness measurement for automatic exposure control comprising:

a photo-receiving surface on which an image of a scene to be photographed is formed;

a central photometric element disposed in a center of said photo-receiving surface for detecting a central light value from a central area of said scene, said central photometric element having a trapezoid shape whose bottom side is longer than a top side thereof; and a peripheral photometric element surrounding said central photometric element, for detecting a peripheral light value from a peripheral area of said scene independently from said central photometric element.

2. A camera including a photo-sensor as claimed in claim 1.

3. The photo-sensor of claim 1, wherein said central photometric element is approximately 3% of the photometric surface area.

4. The photo-sensor of claim 1, wherein said central photometric element has a bottom side length two and a half times that of a top side length.

5. The photo-sensor of claim 4, wherein said central photometric element has a height twice said top side length.

6. The photo-sensor of claim 4, wherein said bottom side length is one-fifth that of a width of said peripheral photometric area.

* * * * *